United States Patent
Wu et al.

(10) Patent No.: US 12,237,905 B2
(45) Date of Patent: Feb. 25, 2025

(54) METHOD AND DEVICE IN NODES USED FOR WIRELESS COMMUNICATION

(71) Applicants: Keying Wu, Shanghai (CN); Xiaobo Zhang, Shanghai (CN)

(72) Inventors: Keying Wu, Shanghai (CN); Xiaobo Zhang, Shanghai (CN)

(73) Assignee: SHANGHAI TUILUO COMMUNICATION TECHNOLOGY PARTNERSHIP, Shanghai (CN)

( * ) Notice: Subject to any disclaimer, the term of this patent is extended or adjusted under 35 U.S.C. 154(b) by 465 days.

(21) Appl. No.: 17/673,830

(22) Filed: Feb. 17, 2022

(65) Prior Publication Data

US 2022/0263563 A1    Aug. 18, 2022

(30) Foreign Application Priority Data

Feb. 18, 2021   (CN) .......................... 202110187120.7
Dec. 23, 2021   (CN) .......................... 202111586677.4

(51) Int. Cl.
| | |
|---|---|
| *H04L 5/00* | (2006.01) |
| *H04B 7/06* | (2006.01) |
| *H04W 72/0446* | (2023.01) |
| *H04W 72/1263* | (2023.01) |
| *H04W 72/23* | (2023.01) |
| *H04W 76/19* | (2018.01) |

(52) U.S. Cl.
CPC ......... *H04B 7/0697* (2013.01); *H04L 5/0051* (2013.01); *H04W 72/0446* (2013.01); *H04W 72/1263* (2013.01); *H04W 72/23* (2023.01); *H04W 76/19* (2018.02)

(58) Field of Classification Search
CPC ... H04B 7/0695; H04B 7/0697; H04L 5/0048; H04L 5/0051; H04L 5/0053; H04W 72/0446; H04W 72/1263; H04W 72/23; H04W 76/19
See application file for complete search history.

(56) References Cited

U.S. PATENT DOCUMENTS

2015/0327106 A1 * 11/2015 Lee .................. H04L 1/0026
                                                                370/252
2016/0226648 A1 *  8/2016 Lee .................. H04L 1/0026
(Continued)

FOREIGN PATENT DOCUMENTS

EP          3720198  A1 * 10/2020  ........... H04B 17/327

*Primary Examiner* — Wutchung Chu

(57) ABSTRACT

The present disclosure provides a method and device in a node for wireless communications. A first node receives a first information block; receives a first signaling; and as a response to a behavior of receiving the first signaling, stops a first behavior; the first information block indicates a first reference signal set, and the first reference signal set comprises at least one reference signal; the first signaling comprises DCI, the first signaling is used to determine a first transmission state, and the first transmission state indicates a first reference signal; the first transmission state is applied to a first channel and a second channel. The above method temporarily stops the beam failure discovery and/or recovery request for the mismatched reference signals when a reference signal configured by RRC for beam failure monitoring does not match a beam used by a downlink control channel, thus avoiding the waste of resources.

20 Claims, 6 Drawing Sheets

(56) References Cited

U.S. PATENT DOCUMENTS

| | | | |
|---|---|---|---|
| 2020/0220631 A1* | 7/2020 | Onggosanusi | H04B 17/327 |
| 2020/0322887 A1* | 10/2020 | Pao | H04L 5/0057 |
| 2021/0185609 A1* | 6/2021 | Zhou | H04W 72/21 |
| 2021/0337406 A1* | 10/2021 | Zhang | H04L 5/0023 |
| 2022/0240116 A1* | 7/2022 | Ma | H04W 24/10 |
| 2022/0263563 A1* | 8/2022 | Wu | H04W 72/1263 |

* cited by examiner

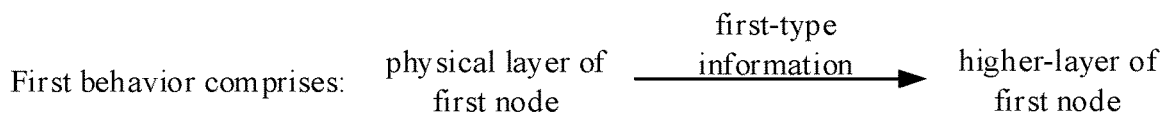
FIG. 6
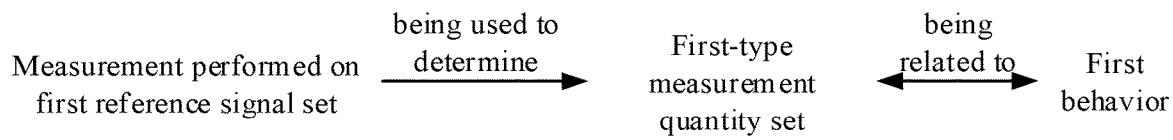
FIG.7
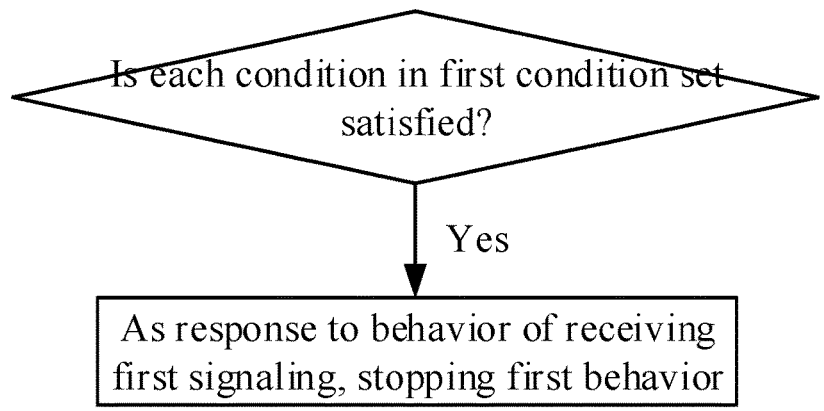
FIG. 8
First condition set
> Time-frequency resources occupied by first signaling belong to first resource set
FIG.9
First condition set
> Value of first higher-layer parameter is equal to target parameter value
FIG.10

First condition set

| First reference signal and second reference signal are quasi-co-located |

FIG. 11

First condition set

| First reference signal and any reference signal in first reference signal set are not quasi-co-located |

FIG.12

First condition set

| First cell is serving cell of first node |

FIG.13

( First node )
↓
Receiving second information block
↓
As response to behavior of receiving second information block, recovering first behavior

FIG.14

METHOD AND DEVICE IN NODES USED FOR WIRELESS COMMUNICATION

CROSS REFERENCE TO RELATED APPLICATIONS

This application claims the priority benefit of Chinese Patent Application No.202110187120.7, filed on Feb. 18, 2021, and the priority benefit of Chinese Patent Application No.202111586677.4, filed on Dec. 23, 2021, the full disclosure of which is incorporated herein by reference.

BACKGROUND

Technical Field

The present disclosure relates to transmission methods and devices in wireless communication systems, and in particular to a method and device of radio signal transmission in a wireless communication system supporting cellular networks.

Related Art

Multi-antenna technology is a key technique in both 3rd Generation Partner Project (3GPP) Long-term Evolution (LTE) and New Radio (NR) systems. By configuring a plurality of antennas at a communication node, for instance, at a base station or a User Equipment (UE) to acquire extra spatial degrees of freedom. The plurality of antennas form through beamforming a beam pointing in a specific direction to improve communication quality. When the plurality of antennas belongs to a plurality of Transmitter Receiver Points (TRPs)/panels, the spatial differences among these different TRPs/panels can be utilized to get extra diversity gains. Since the beam formed through beamforming of the plurality of antennas is usually narrow, beams from both sides of communications shall be aligned to enable effective communications. When UE mobility or other factors lead to the out-of-step of a transmission/reception beam, the communications will face a large decline in quality or even communication failure. Beam management is introduced in NR release R15 and R16 for beam selection, update and indication between communication parties. At the same time, beam failure recovery mechanism is introduced to quickly recover beam synchronization when the beams of communication parties are unsynchronized.

SUMMARY

In NR R15 and R16, a control channel and a data channel adopt different beam management/indication mechanisms, and uplink and downlink also adopt different beam management/indication mechanisms. However, in many cases, the control channel and the data channel can adopt a same beam, and there is channel reciprocity between uplink and downlink channels in many application scenarios, so the same beam can be used. Using this feature can greatly reduce the system complexity, signaling overhead and delay. In 3GPP Radio Access Network (RAN) 1 #103e meeting, the technology of using a physical layer signaling to update a beam of the control channel and data channel at the same time has been adopted. The impact of the adoption of this technology on the existing beam-related functions is a problem that needs to be studied and solved.

To address the above problem, the present disclosure provides a solution. It should be noted that although the above description takes the cellular network as an example, the application is also applicable to other scenarios, such as Vehicle-to-Everything (V2X) scenario, where similar technical effects can be achieved. Besides, a unified solution for different scenarios (including but not limited to cellular networks and V2X) can also help reduce hardware complexity and cost. If no conflict is incurred, embodiments in a first node in the present disclosure and the characteristics of the embodiments are also applicable to a second node, and vice versa. And the embodiments in the present disclosure and the characteristics in the embodiments can be arbitrarily combined if there is no conflict.

In one embodiment, interpretations of the terminology in the present disclosure refer to definitions given in the 3GPP TS36 series.

In one embodiment, interpretations of the terminology in the present disclosure refer to definitions given in the 3GPP TS38 series.

In one embodiment, interpretations of the terminology in the present disclosure refer to definitions given in the 3GPP TS37 series.

In one embodiment, interpretations of the terminology in the present disclosure refer to definitions given in Institute of Electrical and Electronics Engineers (IEEE) protocol specifications.

The present disclosure provides a method in a first node for wireless communications, comprising:

receiving a first information block;
receiving a first signaling; and
as a response to the behavior of receiving the first signaling, stopping a first behavior;

herein, the first information block indicates a first reference signal set, and the first reference signal set comprises at least one reference signal; the first signaling comprises DCI, the first signaling is used to determine a first transmission state, and the first transmission state indicates a first reference signal; the first transmission state is applied to a first channel and a second channel; the first behavior is related to a measurement performed on the first reference signal set.

In one embodiment, a problem to be solved in the present disclosure includes: when a beam used by the downlink control channel has been updated by a physical layer signaling, while a reference signal used for beam failure monitoring is not reconfigured by an RRC, there is a mismatch between the two. The above method solves this problem by temporarily stopping beam failure discovery and/or recovery request for the mismatched reference signal.

In one embodiment, characteristics of the above method include: the first behavior comprises a beam failure discovery and/or recovery request for the first reference signal set, and the behavior of the first signaling indicating the first transmission state leads to the mismatch between the first reference signal set and beams used by the downlink control channel; in this case, the first node temporarily stops the first behavior.

In one embodiment, advantages of the above method include: unnecessary beam failure recovery process is avoided to save resources.

According to one aspect of the present disclosure, it is characterized in that the first behavior comprises that a physical layer of the first node transmits first-type information to a higher layer of the first node.

In one embodiment, the advantage of the above method is that the operation required to avoid unnecessary beam failure recovery procedure is limited to the physical layer, which avoids the impact on the higher layer.

According to one aspect of the present disclosure, comprising:
receiving a first signal in the first channel;
herein, the first signaling comprises scheduling information of the first signal.

According to one aspect of the present disclosure, comprising:
transmitting a first signal in the first channel;
herein, the first signaling comprises scheduling information of the first signal.

According to one aspect of the present disclosure, it is characterized in that when and only when each condition in a first condition set is satisfied, as a response to the behavior of receiving the first signaling, the first behavior is stopped; the first condition set comprises at least one condition.

According to one aspect of the present disclosure, it is characterized in that the first condition set comprises: the first reference signal and any reference signal in the first reference signal set are not Quasi-Co-located (QCL).

In one embodiment, characteristics of the above method include: It is ensured that the first node temporarily stops the beam failure discovery and/or recovery request for the first reference signal set only when the reference signal in the first reference signal set and the beam of the downlink control channel no longer match.

According to one aspect of the present disclosure, it is characterized in that the first reference signal is associated with a first cell, and the first condition set comprises: the first cell is a serving cell of the first node.

According to one aspect of the present disclosure, comprising:
receiving a second information block; and
as a response of the behavior of receiving the second information block, recovering the first behavior;
herein, the second information block is used for updating the first reference signal set; and the second information block is later than the first signaling in time domain According to one aspect of the present disclosure, wherein the first node is a UE.

According to one aspect of the present disclosure, wherein the first node is a relay node.

The present disclosure provides a method in a second node for wireless communications, comprising:
transmitting a first information block; and
transmitting a first signaling;
herein, the first information block indicates a first reference signal set, and the first reference signal set comprises at least one reference signal; the first signaling comprises DCI, the first signaling is used to determine a first transmission state, and the first transmission state indicates a first reference signal; the first transmission state is applied to a first channel and a second channel; as a response to the behavior of receiving the first signaling, a target receiver of the first signaling stops a first behavior; the first behavior is related to a measurement performed on the first reference signal set.

According to one aspect of the present disclosure, it is characterized in that the first behavior comprises that a physical layer of the target receiver of the first signaling transmits first-type information to a higher layer of the target receiver of the first signaling.

According to one aspect of the present disclosure, comprising:
transmitting a first signal in the first channel;
herein, the first signaling comprises scheduling information of the first signal.

According to one aspect of the present disclosure, comprising:
receiving a first signal in the first channel;
herein, the first signaling comprises scheduling information of the first signal.

According to one aspect of the present disclosure, it is characterized in that when and only when each condition in a first condition set is satisfied, as a response to the behavior of receiving the first signaling, the target receiver of the first signaling stops the first behavior; the first condition set comprises at least one condition.

According to one aspect of the present disclosure, it is characterized in that the first condition set comprises: the first reference signal and any reference signal in the first reference signal set are not QCL.

According to one aspect of the present disclosure, it is characterized in that the first reference signal is associated with a first cell, the first condition set comprises: the first cell is a serving cell of the target receiver of the first signaling According to one aspect of the present disclosure, comprising:
transmitting a second information block;
herein, the second information block is used for updating the first reference signal set; and the second information block is later than the first signaling in time domain; as a response to the behavior of receiving the second information block, a target receiver of the second information block recovers the first behavior.

According to one aspect of the present disclosure, wherein the second node is a base station.

According to one aspect of the present disclosure, wherein the second node is a UE.

According to one aspect of the present disclosure, wherein the second node is a relay node.

The present disclosure provides a first node for wireless communications, comprising:
a first processor, receiving a first information block and a first signaling, as a response to the behavior of receiving the first signaling, stopping a first behavior;
herein, the first information block indicates a first reference signal set, and the first reference signal set comprises at least one reference signal; the first signaling comprises DCI, the first signaling is used to determine a first transmission state, and the first transmission state indicates a first reference signal; the first transmission state is applied to a first channel and a second channel; the first behavior is related to a measurement performed on the first reference signal set.

The present disclosure provides a second node for wireless communications, comprising:
a second processor, transmitting a first information block and a first signaling;
herein, the first information block indicates a first reference signal set, and the first reference signal set comprises at least one reference signal; the first signaling comprises DCI, the first signaling is used to determine a first transmission state, and the first transmission state indicates a first reference signal; the first transmission state is applied to a first channel and a second channel; as a response to the behavior of receiving the first signaling, a target receiver of the first signaling stops a first behavior; the first behavior is related to a measurement performed on the first reference signal set.

In one embodiment, the present disclosure has the following advantages over conventional schemes:
When a reference signal configured by RRC for beam failure monitoring does not match a beam used by a downlink control channel due to beam update based on a physical layer signaling, the beam failure discovery and/or recovery request for the mismatched reference signal is temporarily stopped, thus avoiding the waste of resources.

BRIEF DESCRIPTION OF THE DRAWINGS

Other features, objects and advantages of the present disclosure will become more apparent from the detailed description of non-restrictive embodiments taken in conjunction with the following drawings:

FIG. 6 illustrates a schematic diagram of a first behavior comprising a transmission of first-type information from the PHY of a first node to the higher layer of a first node according to one embodiment of the present disclosure;

FIG. 7 illustrates a schematic diagram of a first behavior being related to a measurement performed on a first reference signal set according to one embodiment of the present disclosure;

FIG. 8 illustrates a schematic diagram of a relation between a first condition set and a first behavior according to one embodiment of the present disclosure;

FIG. 9 illustrates a schematic diagram of a first condition set according to one embodiment of the present disclosure;

FIG. 10 illustrates a schematic diagram of a first condition set according to one embodiment of the present disclosure;

FIG. 11 illustrates a schematic diagram of a first condition set according to one embodiment of the present disclosure;

FIG. 12 illustrates a schematic diagram of a first condition set according to one embodiment of the present disclosure;

FIG. 13 illustrates a schematic diagram of a first condition set according to one embodiment of the present disclosure;

FIG. 14 illustrates a schematic diagram of a relation between a second information block and a first behavior according to one embodiment of the present disclosure;

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
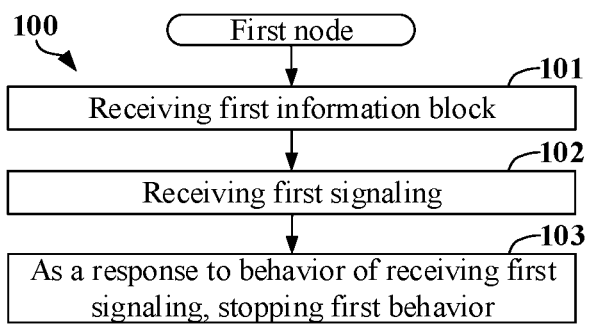
FIG. 1 illustrates a flowchart of a first information block, a first signaling and a first behavior according to one embodiment of the present disclosure.

Embodiment 1 illustrates a flowchart of a first information block, a first signaling and a first behavior according to one embodiment of the present disclosure, as shown in FIG. 1. In step 100 illustrated by FIG. 1, each box represents a step. Particularly, the sequential order of steps in these boxes does not necessarily mean that the steps are chronologically arranged.

In Embodiment 1, the first node in the present disclosure receives a first information block in step 101; receives a first signaling in step 102; as a response to the behavior of receiving the first signaling in step 103, stops a first behavior; herein, the first information block indicates a first reference signal set, and the first reference signal set comprises at least one reference signal; the first signaling comprises DCI, the first signaling is used to determine a first transmission state, and the first transmission state indicates a first reference signal; the first transmission state is applied to a first channel and a second channel; the first behavior is related to a measurement performed on the first reference signal set.

In one embodiment, the first information block is carried by a higher-layer signaling.

In one embodiment, the first information block is carried by a Radio Resource Control (RRC) signaling In one embodiment, the first information block is carried by a Medium Access Control Layer Control Element (MAC CE) signaling In one embodiment, the first information block comprises information in all or partial fields in an Information Element (IE).

In one embodiment, the first information block comprises information in all or partial fields in a RadioLinkMonitoringConfig IE.

In one embodiment, the first information block comprises all or partial information in a failureDetectionResourcesToAddModList field in a RadioLinkMonitoringConfig IE.

In one embodiment, the first information block comprises all or partial information in at least one field in a failureDetectionResourcesToAddModList field or a failureDetectionResourcesToReleaseList field in a RadioLinkMonitoringConfig IE.

In one embodiment, the first information block comprises information in a higher-layer parameter failureDetectionResources.

In one embodiment, the first reference signal set only comprises one reference signal.

In one embodiment, the first reference signal set comprises a plurality of reference signals.

In one embodiment, the first reference signal set comprises two reference signals.

In one embodiment, the reference signal comprises a reference signal port.

In one embodiment, the reference signal comprises a reference signal port resource.

In one embodiment, the reference signal comprises an antenna port.

In one embodiment, a modulation symbol comprised in the reference signal is known to the first node.

In one embodiment, the first reference signal set comprises a Channel State Information-Reference Signal (CSI-RS).

In one embodiment, the first reference signal set comprises a Non-Zero Power (NZP) CSI-RS.

In one embodiment, the first reference signal set comprises a periodic CSI-RS.

In one embodiment, the first reference signal set comprises a Synchronization Signal/physical broadcast channel Block (SSB).

In one embodiment, the first reference signal set comprises a CSI-RS resource.

In one embodiment, the first reference signal set comprises an SSB resource.

In one embodiment, any reference signal in the first reference signal set is a CSI-RS or an SSB.

In one embodiment, any reference signal in the first reference signal set is a CSI-RS resource or an SSB resource.

In one embodiment, the first information block indicates an index of each reference signal in the first reference signal set.

In one embodiment, an index of any reference signal in the first reference signal set comprises one of an SSB-Index or an NZP-CSI-RS-ResourceId.

In one embodiment, the first information block indicates an identity (ID) of a BandWidth Part (BWP) corresponding to each reference signal in the first reference signal set.

In one embodiment, the first information block indicates an ID of a cell to which each reference signal in the first reference signal set is associated.

In one embodiment, an ID of a cell comprises one of a Physical Cell Identity (PCI), a SCellIndex or a ServCellIndex.

In one embodiment, the first information block indicates a first-type higher-layer parameter to which each reference signal in the first reference signal set corresponds, and a name of the first-type higher-layer parameter comprises "purpose".

In one subembodiment of the above embodiment, the first-type higher-layer parameter is configured by an RRC signaling.

In one subembodiment of the above embodiment, a value of the first-type higher-layer parameter to which each reference signal in the first reference signal set corresponds is equal to "beamFailure" or "both".

In one embodiment, all reference signals in the first reference signal set belong to a same carrier.

In one embodiment, all reference signals in the first reference signal set belong to a same BWP.

In one embodiment, all reference signals in the first reference signal set belong to a same serving cell.

In one embodiment, there exist two reference signals in the first reference signal set belonging to different carriers.

In one embodiment, there exist two reference signals in the first reference signal set belonging to different BWPs.

In one embodiment, there exist two reference signals in the first reference signal set belonging to different serving cells.

In one embodiment, the DCI refers to: Downlink Control Information.

In one embodiment, the first signaling is a piece of DCI.

In one embodiment, the first signaling comprises DCI for DownLink Grant.

In one embodiment, the first signaling comprises DCI for UpLink Grant.

In one embodiment, the first signaling indicates the first transmission state.

In one embodiment, the first signaling comprises a first field, and the first field in the first signaling indicates the first transmission state; the first field comprises at least one bit.

In one subembodiment of the above embodiment, the first field comprises information in a Transmission configuration indication field.

In one subembodiment of the above embodiment, the first field comprises three bits.

In one subembodiment of the above embodiment, the first field comprises 1, 2 or 3 bits.

In one subembodiment of the above embodiment, a value of the first field in the first signaling is equal to a Transmission Configuration Indicator (TCI) codepoint corresponding to the first transmission state.

In one subembodiment of the above embodiment, the first transmission state is obtained by table looking-up a value of the first field in the first signaling.

In one embodiment, time-frequency resources occupied by the first signaling are used to determine the first transmission state.

In one embodiment, a DCI format of the first signaling is used to determine the first transmission state.

In one embodiment, the first signaling and any reference signal in the first reference signal set both belong to a same BWP.

In one embodiment, the first signaling and any reference signal in the first reference signal set both belong to a same carrier.

In one embodiment, the first signaling and any reference signal in the first reference signal set both belong to a same serving cell.

In one embodiment, the first signaling and a reference signal in the first reference signal set belong to different BWPs.

In one embodiment, the first signaling and a reference signal in the first reference signal set belong to different carriers.

In one embodiment, the first signaling and a reference signal in the first reference signal set belong to different serving cells.

In one embodiment, the first signaling belongs to a first frequency-domain unit in frequency domain, and the first reference signal set is associated with the first frequency-domain unit.

In one embodiment, the first signaling indicates a first frequency-domain unit, and the first reference signal set is associated with the first frequency-domain unit.

In one embodiment, the first frequency-domain unit is a carrier.

In one embodiment, the first frequency-domain unit is a BWP.

In one embodiment, a third field in the first signaling indicates the first frequency-domain unit, and the third field comprises at least one bit.

In one subembodiment of the above embodiment, a value of the third field indicates the first frequency-domain unit.

In one subembodiment of the above embodiment, the first frequency-domain unit is obtained by table looking-up a value of the third field.

In one subembodiment of the above embodiment, the third field comprises information of a Carrier indicator field.

In one subembodiment of the above embodiment, the third field comprises information of a Bandwidth part indicator field.

In one embodiment, the phrase of the first reference signal set being associated with the first frequency-domain unit includes: any reference signal in the first reference signal set belongs to the first frequency-domain unit in frequency domain.

In one embodiment, the phrase of the first reference signal set being associated with the first frequency-domain unit includes: a fourth information block comprises the first information block, and the fourth information block indicates an index of the first frequency-domain unit.

In one subembodiment of the above embodiment, the fourth information block is a SpCellConfig or a SCellConfig.

In one subembodiment of the above embodiment, the fourth information block is a BWP-Downlink IE.

In one embodiment, the phrase of the first reference signal set being associated with the first frequency-domain unit includes: the first reference signal set is applicable to the first frequency-domain unit.

In one embodiment, the phrase of the first reference signal set being associated with the first frequency-domain unit includes: the first reference signal set is a reference signal for beam failure monitoring and is applicable to the first frequency-domain unit.

In one embodiment, the first signaling does not belong to the first frequency-domain unit in frequency domain.

In one embodiment, the first transmission state comprises a TCI state.

In one embodiment, the first transmission state is a TCI state.

In one embodiment, the first transmission state comprises a QCL relation.

In one embodiment, the first transmission state comprises QCL information.

In one embodiment, the first transmission state comprises a spatial relation.

In one embodiment, the first transmission state comprises information in all or partial fields in an IE.

In one embodiment, the first transmission state comprises all or partial information in a TCI-State IE.

In one embodiment, the first reference signal comprises a CSI-RS.

In one embodiment, the first reference signal comprises an NZP CSI-RS.

In one embodiment, the first reference signal comprises a periodic CSI-RS.

In one embodiment, the first reference signal comprises an SSB.

In one embodiment, the first reference signal is a CSI-RS or an SSB.

In one embodiment, the first transmission state indicates an index of the first reference signal.

In one embodiment, an index of the first reference signal comprises an SSB-Index or an NZP-CSI-RS-ResourceId.

In one embodiment, the first transmission state indicates an ID of a BWP corresponding to the first reference signal.

In one embodiment, the first transmission state indicates an ID of a cell to which the first reference signal is associated.

In one embodiment, the first transmission state indicates a QCL type corresponding to the first reference signal.

In one embodiment, a QCL type corresponding to the first reference signal is one of QCL-TypeA, QCL-TypeB, QCL-TypeC or QCL-TypeD.

In one embodiment, a QCL type corresponding to the first reference signal is QCL-TypeA or QCL-TypeD.

In one embodiment, the first channel and any reference signal in the first reference signal set both belong to a same BWP.

In one embodiment, the first channel and any reference signal in the first reference signal set both belong to a same carrier.

In one embodiment, the first channel and any reference signal in the first reference signal set both belong to a same serving cell.

In one embodiment, both the first channel and the second channel belong to a same BWP.

In one embodiment, both the first channel and the second channel belong to a same carrier.

In one embodiment, both the first channel and the second channel belong to a same serving cell.

In one embodiment, both the first channel and the second channel belong to the first frequency-domain unit.

In one embodiment, the first signaling is used to schedule the first channel.

In one embodiment, the first signaling indicates time-frequency resources occupied by the first channel.

In one embodiment, the first signaling indicates scheduling information of the first channel.

In one embodiment, the first signaling indicates scheduling information of a signal transmitted in the first channel.

In one embodiment, the first signaling is used to schedule a signal transmitted in the first channel.

In one embodiment, the first channel is unrelated to the first signaling.

In one embodiment, time-frequency resources occupied by the first channel are unrelated to the first signaling.

In one embodiment, scheduling information of a signal transmitted in the first channel is unrelated to the first signaling.

In one embodiment, the second channel is unrelated to the first signaling.

In one embodiment, time-frequency resources occupied by the second channel are unrelated to the first signaling.

In one embodiment, scheduling information of a signal transmitted in the second channel is unrelated to the first signaling.

In one embodiment, the first transmission state is only applied to the first channel and the second channel.

In one embodiment, the first transmission state is also applied to at least one channel other than the first channel and the second channel.

In one embodiment, the first transmission state is also applied to a plurality of channels other than the first channel and the second channel.

In one embodiment, the scheduling information comprises one or more of time-domain resources, frequency-domain resources, a Modulation and Coding Scheme (MCS), a DeModulation Reference Signals (DMRS) port, a Hybrid Automatic Repeat reQuest (HARQ) process number, a Redundancy Version (RV), or a New Data Indicator (NDI).

In one embodiment, the first channel comprises a physical channel.

In one embodiment, the first channel comprises an L1 channel.

In one embodiment, the first channel comprises a transport channel.

In one embodiment, the first channel comprises a downlink channel.

In one embodiment, the first channel comprises an uplink channel.

In one embodiment, the first channel comprises a physical shared channel.

In one embodiment, the first channel is a physical shared channel.

In one embodiment, the first channel comprises a Physical Downlink Shared CHannel (PDSCH).

In one embodiment, the first channel is PDSCH.

In one embodiment, the first channel comprises a DownLink-Shared CHannel (DL-SCH).

In one embodiment, the first channel is a DL-SCH.

In one embodiment, the first channel comprises a Physical Uplink Shared Channel (PUSCH).

In one embodiment, the first channel comprises an UpLink-Shared CHannel (UL-SCH).

In one embodiment, the first signaling schedules a plurality of physical channels.

In one subembodiment of the above embodiment, the first channel comprises all or part of the plurality of physical channels.

In one subembodiment of the above embodiment, the physical channel is PDSCH or PUSCH.

In one embodiment, the second channel comprises a physical channel.

In one embodiment, the second channel comprises an L1 channel.

In one embodiment, the second channel comprises a transport channel.

In one embodiment, the second channel comprises a downlink channel.

In one embodiment, the second channel comprises an uplink channel.

In one embodiment, the first channel comprises a downlink channel, and the second channel comprises an uplink channel.

In one embodiment, the first channel comprises an uplink channel, and the second channel comprises a downlink channel.

In one embodiment, the second channel comprises a physical control channel.

In one embodiment, the first channel comprises a physical shared channel, and the second channel comprises a physical control channel.

In one embodiment, the first channel only comprises a physical shared channel, and the second channel comprises a physical control channel.

In one embodiment, the second channel comprises a PDSCH.

In one embodiment, the second channel comprises a PUSCH.

In one embodiment, the first channel comprises a PDSCH, and the second channel comprises a PUSCH.

In one embodiment, the first channel comprises a PUSCH, and the second channel comprises a PDSCH.

In one embodiment, the second channel comprises a Physical Downlink Control Channel (PDCCH) channel.

In one embodiment, the second channel is a PDCCH.

In one embodiment, the second channel comprises a plurality of PDCCHs.

In one embodiment, the first channel comprises a PDSCH, and the second channel comprises a PDCCH.

In one embodiment, the first channel only comprises a PDSCH, and the second channel comprises a PDCCH.

In one embodiment, the first channel comprises a PUSCH, and the second channel comprises a PDCCH.

In one embodiment, the second channel comprises a DL-SCH.

In one embodiment, the second channel comprises a UL-SCH.

In one embodiment, the first channel comprises a DL-SCH, and the second channel comprises a UL-SCH.

In one embodiment, the first channel comprises a UL-SCH, and the second channel comprises a DL-SCH.

In one embodiment, the first transmission state is applied to a third channel other than the first channel and the second channel; the first channel comprises a PDSCH, the second channel comprises a PDCCH, and the third channel comprises a PUSCH and/or Physical Uplink Control Channel (PUCCH).

In one embodiment, the phrase of the first behavior being related to a measurement performed on the first reference signal set includes: a measurement performed on the first reference signal set is used to determine whether the first behavior is executed.

In one embodiment, the phrase of the first behavior being related to a measurement performed on the first reference signal set includes: the first behavior comprises performing a measurement on the first reference signal set.

In one embodiment, the first behavior comprises performing a measurement on the first reference signal set.

In one embodiment, the first behavior comprises maintaining a first counter.

In one embodiment, the first behavior comprises maintaining the first counter according to whether a beam failure instance indication from the physical layer is received.

In one embodiment, the first behavior comprises determining whether a value of the first counter is increased by 1 or remains unchanged according to whether a beam failure instance indication from the physical layer is received.

In one embodiment, the first behavior comprises transmitting a third signal.

In one embodiment, the first behavior comprises determining whether the third signal is transmitted according to a value of a first counter.

In one embodiment, the first behavior comprises when a value of a first counter is greater than or equal to a first counter threshold, transmitting the third signal.

In one embodiment, the first counter is BFI_COUNTER.

In one embodiment, the first counter threshold is equal to beamFailureInstanceMaxCount.

In one embodiment, the first counter threshold is configured by a higher-layer parameter, and a name of the higher-layer parameter configuring the first counter threshold comprises "beamFailureInstance".

In one embodiment, the third signal is used for a beam failure recovery.

In one embodiment, the third signal comprises a beam failure recovery request.

In one embodiment, the third signal comprises a random access preamble used for a Beam Failure Recovery Request.

In one embodiment, the third signal comprises a Beam Failure Recovery (BFR) MAC CE or a truncated BFR MAC CE.

In one embodiment, the third signal comprises a scheduling request for beam failure recovery.

In one embodiment, the meaning of the phrase of stopping a first behavior includes: regardless of a measurement result for the first reference signal set, the first node stops the first behavior.

In one embodiment, the meaning of the phrase of stopping a first behavior includes: stops a measurement performed on the first reference signal set.

In one embodiment, the meaning of the phrase of stopping a first behavior includes: stopping the first counter;

In one embodiment, the meaning of the phrase of stopping a first behavior includes: stopping adding 1 to the first counter.

In one embodiment, the meaning of the phrase of stopping a first behavior includes: whether a beam failure instance indication from the physical layer is received or not, a value of the first counter remains unchanged.

In one embodiment, the meaning of the phrase of stopping a first behavior includes: stopping transmitting the third signal.

In one embodiment, the meaning of the phrase of stopping a first behavior includes: regardless of whether a value of the first counter is greater than or equal to the first counter threshold, the third signal is not transmitted.

Embodiment 2

Figure 2:
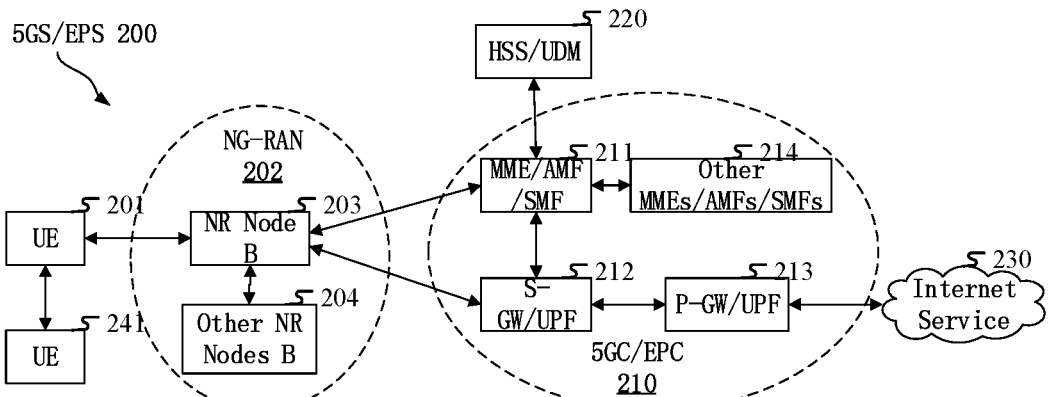
FIG. 2 illustrates a schematic diagram of a network architecture according to one embodiment of the present disclosure.

Embodiment 2 illustrates a schematic diagram of a network architecture according to one embodiment of the present disclosure, as shown in FIG. 2.

FIG. 2 is a diagram illustrating a network architecture 200 of Long-Term Evolution (LTE), Long-Term Evolution Advanced (LTE-A) and future 5G systems. The LTE, LTE-A and future 5G systems network architecture 200 may be called an Evolved Packet System (EPS) 200. The 5G NR or LTE network architecture 200 may be called a 5G System (5GS)/Evolved Packet System (EPS) 200 or other appropriate terms. The 5GS/EPS 200 may comprise one or more UEs 201, a UE 241 that is in sidelink communications with a UE 201, an NG-RAN 202, a 5G-Core Network/Evolved Packet Core (5GC/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will find it easy to understand that various concepts presented throughout the present disclosure can be extended to networks providing circuit switching services. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of the UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, game consoles, unmanned aerial vehicles (UAV), aircrafts, narrow-band physical network devices, machine-type communication devices, land vehicles, automobiles, wearable devices, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMES/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Services.

In one embodiment, the first node in the present disclosure comprises the UE 201.

In one embodiment, the second node in the present disclosure comprises the gNB 203.

In one embodiment, a radio link between the UE 201 and the gNB 203 is a cellular network link.

In one embodiment, a transmitter of the first information block in the present disclosure comprises the gNB 203.

In one embodiment, a receiver of the first information block in the present disclosure comprises the UE 201.

In one embodiment, a transmitter of the first signaling in the present disclosure comprises the gNB 203.

In one embodiment, a receiver of the first signaling in the present disclosure comprises the UE 201.

Embodiment 3

Figure 3:
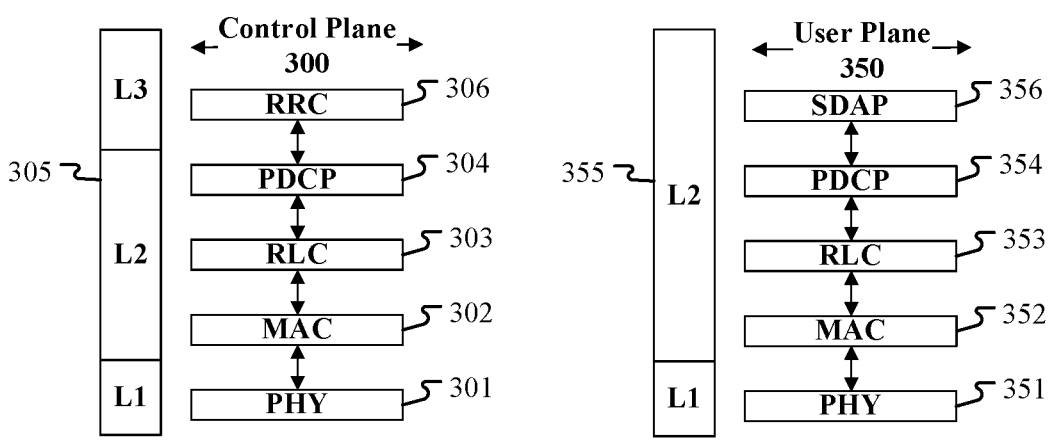
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane according to one embodiment of the present disclosure, as shown in FIG. 3.

Embodiment 3 illustrates a schematic diagram of an example of a radio protocol architecture of a user plane and a control plane according to one embodiment of the present disclosure, as shown in FIG. 3. FIG. 3 is a schematic diagram illustrating an embodiment of a radio protocol architecture of a user plane 350 and a control plane 300. In FIG. 3, the radio protocol architecture for a first communication node (UE, gNB or RSU in V2X) and a second communication node (gNB, UE or RSU in V2X), or between two UEs is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of a link between a first communication node and a second communication node, or between two UEs. L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication node. The PDCP sublayer 304 provides multiplexing among variable radio bearers and logical channels. The PDCP sublayer 304 provides security by encrypting a packet and provides support for a first communication node handover between second communication nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. The Radio Resource Control (RRC) sublayer 306 in layer 3(L3) of the control plane 300 is responsible for acquiring radio resources (i.e., radio bearer) and configuring the lower layer with an RRC signaling between a second communication node and a first communication node device. The radio protocol architecture of the user plane 350 comprises layer 1 (L1) and layer 2 (L2). In the user plane 350, the radio protocol architecture for the first communication node and the second communication node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the first communication node may comprise several higher layers above the L2 layer 355, such as a network layer (e.g., IP layer) terminated at a P-GW of the network side and an application layer terminated at the other side of the connection (e.g., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first information block is generated by the RRC sublayer 306.

In one embodiment, the first signaling is generated by the PHY 301 or the PHY 351.

In one embodiment, the first signaling is generated by the MAC sublayer 302 or the MAC sublayer 352.

Embodiment 4

Figure 4:
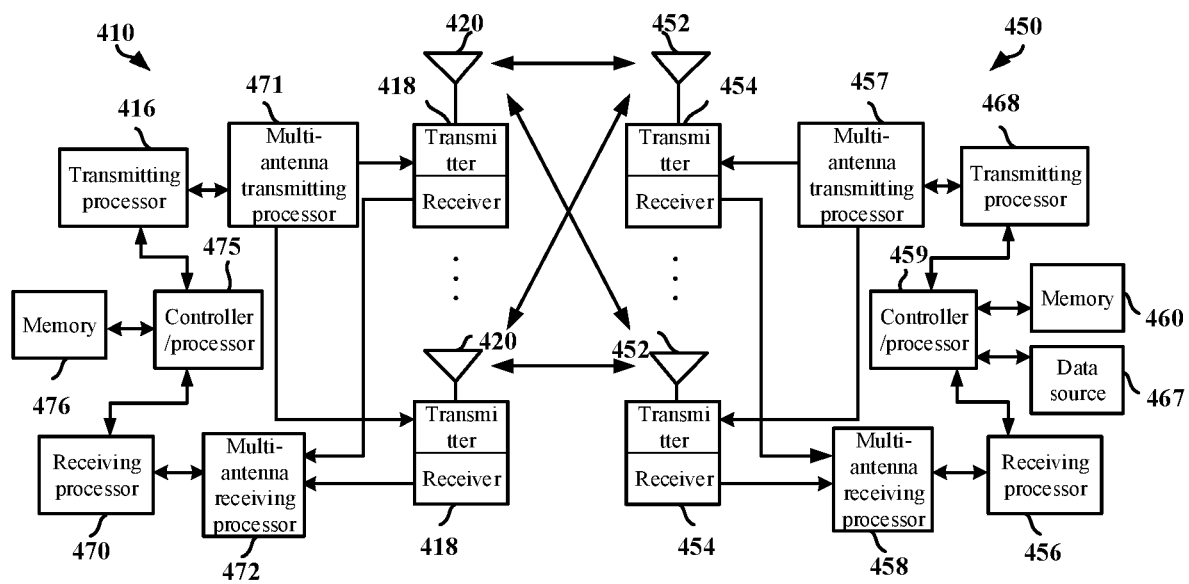
FIG. 4 illustrates a schematic diagram of a first communication device and a second communication device according to one embodiment of the present disclosure.

Embodiment 4 illustrates a schematic diagram of a first communication device and a second communication device according to one embodiment of the present disclosure, as shown in FIG. 4. FIG. 4 is a block diagram of a first communication device 410 in communication with a second communication device 450 in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from the core network is provided to a controller/processor 475. The controller/processor 475 provides a function of the L2 layer. In DL transmission, the controller/processor 475 provides header compression, encryption, packet segmentation and reordering, and multiplexing between a logical channel and a transport channel, and radio resource allocation for the second communication device 450 based on various priorities. The controller/processor 475 is also in charge of HARQ operation, retransmission of a lost packet, and a signaling to the second communication node 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 450, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more parallel streams. The transmitting processor 416 then maps each parallel stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream. Each radio frequency stream is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any second communication device 450-targeted parallel stream. Symbols on each parallel stream are demodulated and recovered in the receiving processor 456 to generate a soft decision. Then the receiving processor 456 decodes and de-interleaves the soft decision to recover the higher-layer data and control signal transmitted on the physical channel by the first communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In downlink (DL) transmission, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing. The controller/processor 459 also performs error detection using ACK and/or NACK protocols as a way to support HARQ operation.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in DL transmission, the controller/processor 459 performs header compression, encryption, packet segmentation and reordering, and multiplexing between a logical channel and a transport channel based on radio resource allocation of the first communication device 410 so as to provide the L2 layer functions used for the user plane and the control plane. The controller/processor 459 is also responsible for HARQ operation, retransmission of a lost packet, and a signaling to the first communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated parallel streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. the controller/processor 475 provides de-multiplexing between a transport channel and a logical channel, packet reassembling, decryption, header decompression, control signal processing so as to recover a higher-layer packet from the second communication device 450. The higher-layer packet coming from the controller/processor 475 may be provided to the core network. The controller/processor 475 can also perform error detection using ACK and/or NACK protocols to support HARQ operation.

In one embodiment, the second communication device 450 comprises at least one processor and at least one memory. The at least one memory comprises computer program codes; the at least one memory and the computer program codes are configured to be used in collaboration with the at least one processor. The second communication device 450 at least: receives the first information block; and receives the first signaling.

In one embodiment, the second communication device 450 comprises a memory that stores a computer readable instruction program. The computer readable instruction program generates an action when executed by at least one processor. The action includes: receiving the first information block; and receiving the first signaling In one embodiment, the first communication device 410 comprises at least one processor and at least one memory. The at least one memory comprises computer program codes; the at least one memory and the computer program codes are configured to be used in collaboration with the at least one processor. The first communication device 410 at least: transmits the first information block; and transmits the first signaling.

In one embodiment, the first communication device 410 comprises a memory that stores a computer readable instruction program. The computer readable instruction program generates an action when executed by at least one processor. The action includes: transmitting the first information block; and transmitting the first signaling.

In one embodiment, the first node in the present disclosure comprises the second communication device 450 in the present disclosure.

In one embodiment, the second node in the present disclosure comprises the first communication device 410.

In one embodiment, at least one of the antenna 452, the receiver 454, the receiving processor 456, the multi-antenna receiving processor 458, the controller/processor 459, the memory 460, or the data source 467 is used to receive the first information block in the present disclosure; and at least one of the antenna 420, the transmitter 418, the transmitting processor 416, the multi-antenna transmitting processor 471, the controller/processor 475, or the memory 476 is used to transmit the first information block.

In one embodiment, at least one of the antenna 452, the receiver 454, the receiving processor 456, the multi-antenna receiving processor 458, the controller/processor 459, the memory 460, or the data source 467 is used to receive the first signaling; and at least one of the antenna 420, the transmitter 418, the transmitting processor 416, the multi-antenna transmitting processor 471, the controller/processor 475, or the memory 476 is used to transmit the first signaling.

In one embodiment, at least one of the antenna 452, the transmitter/receiver 454, the transmitting processor 468, the receiving processor 456, the multi-antenna transmitting processor 457, the multi-antenna receiving processor 458, the controller/processor 459, the memory 460, or the data source 467 is used to stop, execute or recovery the first behavior.

In one embodiment, at least one of the antenna 420, the receiver 418, the receiving processor 470, the multi-antenna receiving processor 472, the controller/processor 475 or the memory 476 is used to receive the first signal; and at least one of the antenna 452, the transmitter 454, the transmitting processor 468, the multi-antenna transmitting processor 457, the controller/processor 459 or the memory 460 is used to transmit the first signal.

In one embodiment, at least one of the antenna 452, the receiver 454, the receiving processor 456, the multi-antenna receiving processor 458, the controller/processor 459, the memory 460, or the data source 467 is used to receive the first signal; and at least one of the antenna 420, the transmitter 418, the transmitting processor 416, the multi-antenna transmitting processor 471, the controller/processor 475, or the memory 476 is used to transmit the first signal.

In one embodiment, at least one of the antenna 452, the receiver 454, the receiving processor 456, the multi-antenna receiving processor 458, the controller/processor 459, the memory 460, or the data source 467 is used to receive the second information block; and at least one of the antenna 420, the transmitter 418, the transmitting processor 416, the multi-antenna transmitting processor 471, the controller/processor 475, or the memory 476 is used to transmit the second information block.

Embodiment 5

Figure 5:
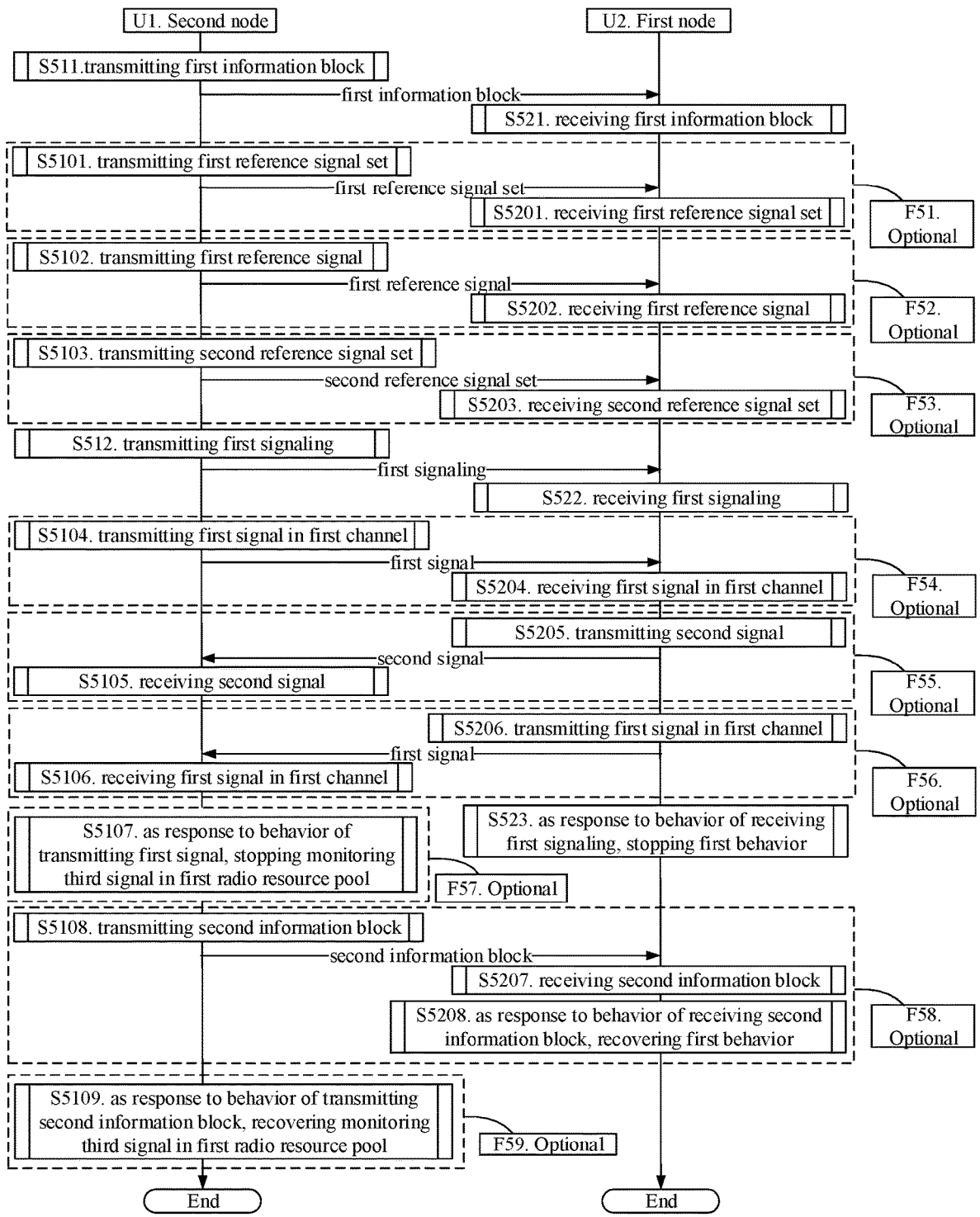
FIG. 5 illustrates a flowchart of wireless communications according to one embodiment of the present disclosure.

Embodiment 5 illustrates a flowchart of wireless transmission according to one embodiment in the present disclosure, as shown in FIG. 5. In FIG. 5, a second node U1 and a first node U2 are communication nodes transmitted via an air interface. In FIG. 5, steps in F51 and F59 are respectively optional.

The second node U1 transmits a first information block in step S511; transmits a first reference signal set in step S5101; transmits a first reference signal in step S5102; transmits a second reference signal set in step S5103; transmits a first signaling in step S512; transmits a first signal in a first channel in step S5104; receives a second signal in step S5105; receives a first signal in a first channel in step S5106; as a response to the behavior of transmitting the first signaling in step S5107, stops monitoring a third signal in a first radio resource pool; transmits a second information block in step S5108; and as a response to the behavior of transmitting the second information block in step S5109, recovers monitoring the third signal in the first radio resource pool.

The first node U2 receives a first information block in step S521; receives a first reference signal set in step S5201; receives a first reference signal in step S5202; receives a second reference signal set in step S5203; receives a first signaling in step S522; receives a first signal in a first channel in step S5204; transmits a second signal in step S5205; transmits a first signal in a first channel in step S5206; as a response to the behavior of receiving the first signaling in step S523, stops a first behavior; receives a second information block in step S5207; and as a response of the behavior of receiving the second information block in step S5208, recovers the first behavior.

In embodiment 5, the first information block indicates the first reference signal set, and the first reference signal set comprises at least one reference signal; the first signaling comprises DCI, the first signaling is used by the first node U2 to determine a first transmission state, and the first transmission state indicates a first reference signal; the first transmission state is applied to the first channel and a second channel; and the first behavior is related to a measurement performed on the first reference signal set.

In one embodiment, the first node U2 is the first node in the present disclosure.

In one embodiment, the second node U1 is the second node in the present disclosure.

In one embodiment, an air interface between the second node U1 and the first node U2 comprises a radio interface between a base station and a UE.

In one embodiment, an air interface between the second node U1 and the first node U2 comprises a radio interface between UEs.

In one embodiment, the second node U1 is a maintenance base station of a serving cell of the first node U2.

In one embodiment, the first information block is transmitted in a PDSCH.

In one embodiment, a channel occupied by the first information block comprises a PDSCH.

In one embodiment, the first signaling is transmitted in a downlink physical layer control channel (i.e., a downlink channel only capable of carrying a physical layer signaling).

In one embodiment, the first signaling is transmitted in a PDCCH.

In one embodiment, steps in box F51 in FIG. 5 exist.

In one embodiment, steps in box F52 in FIG. 5 exist.

In one embodiment, steps in box F53 in FIG. 5 exist; when and only when each condition in a first condition set is satisfied, and as a response to the behavior of receiving the first signaling, the first node U2 stops the first behavior; the first condition set comprises: the first reference signal and a second reference signal are QCL, the second reference signal belongs to the second reference signal set, and a second-type measurement quantity corresponding to the second reference signal is greater than or equal to a second threshold.

In one embodiment, steps in boxes F54 and F56 in FIG. 5 cannot exist at the same time.

In one embodiment, steps in box F54 in FIG. 5 exist, and the first channel comprises a PDSCH.

In one embodiment, steps in box F56 in FIG. 5 exist, and the first channel comprises a PUSCH.

In one embodiment, the first signal comprises a baseband signal.

In one embodiment, the first signal comprises a radio signal.

In one embodiment, the first signal comprises a Radio-Frequency (RF) signal.

In one embodiment, the first signal carries at least one of a Transport Block (TB), a Code Block (CB) or a Code Block Group (CBG).

In one embodiment, the first signaling is used to schedule the first signal.

In one embodiment, a TCI state of the first signal is the first transmission state.

In one embodiment, a spatial relation of the first signal is the first transmission state.

In one embodiment, the first transmission state is used to indicate a spatial relation of the first signal.

In one embodiment, a transmitting antenna port of the first signal and the first reference signal are QCL.

In one embodiment, a transmitting antenna port of the first signal and the first reference signal are QCL corresponding to QCL-TypeD.

In one embodiment, a DMRS of the first signal and the first reference signal are QCL.

In one embodiment, a DMRS of the first signal and the first reference signal are QCL corresponding to QCL-TypeD.

In one embodiment, the first node uses a same spatial-domain filter to receive the first reference signal and the first signal.

In one embodiment, the first node uses a same spatial-domain filter to receive the first reference signal and transmit the first signal.

In one embodiment, large-scale properties of a channel that the first reference signal goes through can be used to infer large-scale properties of a channel that the first signal goes through.

In one embodiment, the large-scale properties include one or more of delay spread, Doppler spread, Doppler shift, average delay, or Spatial Rx parameters.

In one embodiment, the first signal is transmitted on a PDSCH.

In one embodiment, a transmission channel corresponding to the first signal is a DL-SCH.

In one embodiment, the first signal is transmitted on a PUSCH.

In one embodiment, a transmission channel corresponding to the first signal is a UL-SCH.

In one embodiment, steps in the box marked by F55 in FIG. 5 exist; and the second signal indicates that the first signaling is correctly received.

In one embodiment, steps in boxes F54 and F55 in FIG. 5 exist; and the second signal indicates that the first signal is correctly received.

In one embodiment, the second signal comprises a baseband signal.

In one embodiment, the second signal comprises a radio signal.

In one embodiment, the second signal comprises an RF signal.

In one embodiment, the first signaling is used to determine time-domain resources occupied by the second signal.

In one embodiment, the second signal is transmitted on a PUCCH.

In one embodiment, the second signal is transmitted on a PUSCH.

In one embodiment, the second signal comprises Uplink Control Information (UCI).

In one embodiment, the second signal comprises HARQ-ACK (Acknowledgement).

In one embodiment, the second signal comprises an ACK.

In one embodiment, as a response to the behavior of receiving the first signaling, the first node stops the first behavior after a first time, and the first signaling is used to determine the first time.

In one embodiment, as a response to the behavior of receiving the first signaling, the first node stops the first behavior from a first time, and the first signaling is used to determine the first time.

In one embodiment, time-domain resources occupied by the first signaling are used to determine the first time.

In one embodiment, time-domain resources occupied by the first signal are used to determine the first time.

In one embodiment, the first signaling is used to determine time-domain resources occupied by the first signal, and time-domain resources occupied by the first signal are used to determine the first time.

In one embodiment, time-domain resources occupied by the second signal are used to determine the first time.

In one embodiment, the first signaling is used to determine time-domain resources occupied by the second signal, and time-domain resources occupied by the second signal are used to determine the first time.

In one embodiment, a time interval between the first time and the first reference time is a first interval; the first reference time is not later than the first time, and time-domain resources occupied by the first signaling are used to determine the first reference time.

In one embodiment, a time interval between the first time and the first reference time is a first interval; the first reference time is not later than the first time, and time-domain resources occupied by the first signal are used to determine the first reference time.

In one embodiment, a time interval between the first time and the first reference time is a first interval; the first reference time is not later than the first time, and time-domain resources occupied by the second signal are used to determine the first reference time.

In one embodiment, the first reference time is a start or end time of time-domain resources occupied by the first signaling In one embodiment, the first reference time is a start or end time of a time unit occupied by the first signaling.

In one embodiment, the first reference time is a start or end time of time-domain resources occupied by the first signal.

In one embodiment, the first reference time is a start or end time of a time unit occupied by the first signal.

In one embodiment, the first reference time is a start or end time of time-domain resources occupied by the second signal.

In one embodiment, the first reference time is a start or end time of a time unit occupied by the second signal.

In one embodiment, the first interval is measured by the time unit.

In one embodiment, the first interval is measured by slot.

In one embodiment, the first interval is measured by sub-slot.

In one embodiment, the first interval is measured by multicarrier symbol.

In one embodiment, the first interval is a non-negative integer.

In one embodiment, the first interval is equal to 0.

In one embodiment, the first interval is greater than 0.

In one embodiment, the first interval is fixed.

In one embodiment, the first interval is configured by a higher-layer parameter.

In one embodiment, a said time unit is a slot.

In one embodiment, a said time unit is a sub-slot.

In one embodiment, a said time unit is a multicarrier symbol.

In one embodiment, a said time unit comprises more than one consecutive multicarrier symbols.

In one embodiment, a number of multicarrier symbols comprised in a said time unit is configured by a higher-layer parameter.

In one embodiment, the first signaling indicates time-domain resources occupied by the first signal.

In one embodiment, time-domain resources of the first signaling are used to determine time-domain resources occupied by the first signal.

In one embodiment, the first signaling indicates time-domain resources occupied by the second signal.

In one embodiment, time-domain resources of the first signaling are used to determine time-domain resources occupied by the second signal.

In one embodiment, the first signaling belongs to a first time unit in time domain, the second signal belongs to a third time unit in time domain, and a time interval between the first time unit and the third time unit is a third interval.

In one embodiment, the first signaling belongs to a first time unit in time domain, the first signal belongs to a second time unit in time domain, and a time interval between the first time unit and the second time unit is a third interval.

In one embodiment, time-domain resources of the first signal are used to determine time-domain resources occupied by the second signal.

In one embodiment, the first signal belongs to a second time unit in time domain, the second signal belongs to a third time unit in time domain, and a time interval between the second time unit and the third time unit is a third interval.

In one embodiment, the third interval is fixed.

In one embodiment, the first signaling indicates the third interval.

In one embodiment, the third interval is configured by an RRC signaling

In one embodiment, the third interval is measured by the time unit.

In one embodiment, the third interval is measured by slot.

In one embodiment, the third interval is measured by multicarrier symbol.

In one embodiment, the third interval is a non-negative integer.

In one embodiment, the first signaling indicates a first multicarrier symbol occupied by the first signal in the second time unit.

In one embodiment, a position of a first multicarrier symbol occupied by the second signal in the third time unit is RRC configured.

In one embodiment, the multicarrier symbol comprises an Orthogonal Frequency Division Multiplexing (OFDM) symbol.

In one embodiment, the multicarrier symbol comprises a Single Carrier-Frequency Division Multiple Access (SC-FDMA) symbol.

In one embodiment, the multicarrier symbol comprises a Discrete Fourier Transform Spread OFDM (DFT-S-OFDM) symbol.

In one embodiment, steps in box F57 in FIG. 5 exist; as a response to the behavior of transmitting the first signaling, the second node U1 stops monitoring the third signal in the first radio resource pool.

In one embodiment, the first radio resource pool comprises at least one Physical Random Access CHannel (PRACH) resource.

In one subembodiment of the above embodiment, a PRACH resource comprises a PRACH occasion.

In one subembodiment of the above embodiment, a PRACH resource comprises a random access preamble.

In one subembodiment of the above embodiment, a PRACH resource comprises a random access preamble index.

In one subembodiment of the above embodiment, a PRACH resource comprises time-frequency resources.

In one subembodiment of the above embodiment, the first radio resource pool only comprises a PRACH resource.

In one subembodiment of the above embodiment, the first radio resource pool only comprises a plurality of PRACH resources.

In one embodiment, the first radio resource pool comprises a contention-free random access preamble.

In one embodiment, the first radio resource pool comprises a contention-free PRACH resources.

In one embodiment, the first radio resource pool comprises a PRACH resource used for beam failure recovery.

In one embodiment, the first radio resource pool comprises dedicated PRACH resources used for beam failure recovery.

In one embodiment, the first radio resource pool comprises PUCCH resources.

In one embodiment, the monitoring refers to blind decoding, that is, a signal is received and decoding operation is executed; if a Cyclic Redundancy Check (CRC) bit determines that the decoding is correct, it is judged that the third signal is received; otherwise it is judged that the third signal is not received.

In one embodiment, the monitoring refers to a coherent detection based reception, that is, coherent reception is executed and energy of a signal acquired after the coherent reception is measured; if the energy of the signal acquired after the coherent reception is greater than a first given threshold, it is judged that the third signal is received; otherwise it is judged that the third signal is not received.

In one embodiment, the monitoring refers to an energy detection based reception, that is, energy of a radio signal is sensed and is averaged to acquire received energy; if the received energy is greater than a second given threshold, it is judged that the third signal is received; otherwise it is judged that the third signal is not received.

In one embodiment, the meaning of the phrase of monitoring a third signal includes determining whether the third signal is transmitted according to CRC, and it is not determined whether the third signal is transmitted before judging whether decoding according to the CRC is correct.

In one embodiment, the meaning of the phrase of monitoring a third signal includes determining whether the third signal is transmitted according to a coherent detection; and not determining whether the third signal is transmitted before a coherent detection.

In one embodiment, the meaning of the phrase of monitoring a third signal includes determining whether the third signal is transmitted according to an energy detection; and not determining whether the third signal is transmitted before an energy detection.

In one embodiment, as a response to the behavior of transmitting the first signaling, the second node stops monitoring the third signal in the first radio resource pool after the first time.

In one embodiment, when and only when each condition in the first condition set is satisfied, as a response to the behavior of transmitting the first signaling, the second node stops monitoring the third signal in the first radio resource pool.

In one embodiment, steps in box F58 in FIG. 5 exist; the second information block is used for updating the first reference signal set; and the second information block is later than the first signaling in time domain; as a response of the behavior of receiving the second information block, the first node recovers the first behavior.

In one embodiment, the second information block is used by the first node to update the first reference signal set.

In one embodiment, the second information block is used by the second node to update the first reference signal set.

In one embodiment, the second information block is transmitted in a PDSCH.

In one embodiment, a target receiver of the second information block comprises a target receiver of the first signaling In one embodiment, a target receiver of the first signaling comprises a target receiver of the second information block.

In one embodiment, a target receiver of the second information block is a target receiver of the first signaling.

In one embodiment, steps in box F59 in FIG. 5 exist; in response to the behavior of transmitting the second information block, the second node recovers monitoring the third signal in the first radio resource pool.

Embodiment 6

Embodiment 6 illustrates a schematic diagram of a first behavior comprising a transmission of first-type information from the physical layer of a first node to the higher layer of a first node according to one embodiment of the present disclosure, as shown in FIG. 6.

In one embodiment, the higher layer of the first node comprises a MAC layer.

In one embodiment, the higher layer of the first node is a MAC layer.

In one embodiment, the higher layer of the first node comprises a MAC entity.

In one embodiment, the higher layer of the first node comprises an RRC layer.

In one embodiment, the first-type information comprises an indication transmitted by the physical layer of the first node to the higher layer of the first node.

In one embodiment, the first-type information comprises a beam failure instance indication.

In one embodiment, the first-type information is a beam failure instance indication.

In one embodiment, the first-type information comprises an out-of-sync indication.

In one embodiment, the first-type information comprises an in-sync indication.

In one embodiment, a said first-type information is used to indicate a beam failure instance.

In one embodiment, the first behavior comprises determining whether the physical layer of the first node transmits the first-type information to the higher layer of the first node according to a measurement performed on the first reference signal set.

In one embodiment, the meaning of the phrase of stopping a first behavior includes: regardless of a measurement result for the first reference signal set, the physical layer of the first node does not transmit the first-type information to the higher layer of the first node.

In one embodiment, the meaning of the phrase of stopping a first behavior includes: stopping determining whether the physical layer of the first node transmits the first-type information to the higher layer of the first node according to a measurement performed on the first reference signal set.

Embodiment 7

Embodiment 7 illustrates a schematic diagram of a first behavior being related to a measurement performed on a first reference signal set according to one embodiment of the present disclosure, as shown in FIG. 7. In embodiment 7, a measurement performed on the first reference signal set is used to determine a first-type measurement quantity set, and the first-type measurement quantity set comprises at least one first-type measurement quantity; the first behavior is related to the first-type measurement quantity set.

In one embodiment, a number of reference signals comprised in the first reference signal set is equal to a number of first-type measurement quantities comprised in the first-type measurement quantity set.

In one embodiment, the first reference signal set only comprises one reference signal, the first-type measurement quantity set only comprises one first-type measurement quantity, and a measurement performed on the reference signal is used to determine the first-type measurement quantity.

In one embodiment, the first reference signal set comprises S1 reference signals, and the first-type measurement quantity set comprises S1 first-type measurement quantities, S1 being a positive integer greater than 1; measurements performed on the S1 reference signals are respectively used to determine the S1 first-type measurement quantities.

In one embodiment, for any given reference signal in the first reference signal group set, a measurement performed on the given reference signal in a first time interval is used to determine a first-type measurement quantity corresponding to the given reference signal.

In one embodiment, for any given reference signal in the first reference signal set, the first node calculates a first-type measurement quantity corresponding to the given reference signal only according to a measurement for the given reference signal within a first time interval.

In one embodiment, the measurement comprises a channel measurement.

In one embodiment, the measurement comprises an interference measurement.

In one embodiment, the first time interval is a consecutive duration.

In one embodiment, a length of the first time interval is equal to $T_{Evaluate\_BFD\_SSB}$ ms or $T_{Evaluate\_BFD\_CSI-RS}$ ms.

In one embodiment, definitions of the $T_{Evaluate\_BFD\_SSB}$ and the $T_{Evaluate\_BFD\_CSI-RS}$ can be found in 3GPP TS38.133.

In one embodiment, any first-type measurement quantity in the first-type measurement quantity set comprises Reference Signal Received Power (RSRP).

In one embodiment, any first-type measurement quantity in the first-type measurement quantity set comprises an L1-RSRP.

In one embodiment, any first-type measurement quantity in the first-type measurement quantity set is an L1-RSRP.

In one embodiment, any first-type measurement quantity in the first-type measurement quantity set comprises a Signal-to-noise and interference ratio (SINR).

In one embodiment, any first-type measurement quantity in the first-type measurement quantity set comprises an L1-SINR.

In one embodiment, any first-type measurement quantity in the first-type measurement quantity set is an L1-SINR.

In one embodiment, any first-type measurement quantity in the first-type measurement quantity set comprises a BLock Error Rate (BLER).

In one embodiment, any first-type measurement quantity in the first-type measurement quantity set is a BLER.

In one embodiment, a given reference signal is a reference signal in the first reference signal set.

In one subembodiment of the above embodiment, a first-type measurement quantity corresponding to the given reference signal is equal to one of an RSRP, an L1-RSRP, an SINR or an L1-SINR of the given reference signal.

In one subembodiment of the above embodiment, a first-type measurement quantity corresponding to the given reference signal is obtained by table looking-up an RSRP, an L1-RSRP, an SINR or an L1-SINR of the given reference signal.

In one subembodiment of the above embodiment, the given reference signal is any reference signal in the first reference signal set.

In one embodiment, any first-type measurement quantity in the first-type measurement quantity set is obtained according to hypothetical PDCCH transmission parameters.

In one embodiment, the specific meaning of the hypothetical PDCCH transmission parameters can be found in 3GPP TS38.133.

In one embodiment, the first behavior comprises: a measurement is performed on the first reference signal set to obtain the first-type measurement quantity set.

In one embodiment, the first behavior comprises determining whether the PHY of the first node transmits the first-type information to the higher layer of the first node according to the first-type measurement set.

In one embodiment, the first behavior is related to whether a first condition is satisfied; the first condition comprises that each first-type measurement quantity in the first-type measurement quantity set is worse than a first threshold.

In one embodiment, the first threshold is a real number.

In one embodiment, the first threshold is a non-negative real number.

In one embodiment, the first threshold is a non-negative real number not greater than 1.

In one embodiment, the first threshold is equal to one of $Q_{out\_L}$, $Q_{out\_LR\_SSB}$ or $Q_{out\_LR\_CSI-RS}$.

In one embodiment, the specific meaning of the $Q_{out\_L}$, $Q_{out\_LR\_SSB}$ and $Q_{out\_LR\_CSI-RS}$ can be found in 3GPP TS38.133.

In one embodiment, the first threshold is configured by a higher-layer parameter rlmInSyncOutOfSyncThreshold.

In one embodiment, if any given first-type measurement quantity in the first-type measurement quantity set is one of an RSRP, an L1-RSRP, an SINR or an L1-SINR and the given first-type measurement quantity is less than the first threshold; the given first-type measurement quantity is worse than the first threshold.

In one embodiment, if any given first-type measurement quantity in the first-type measurement quantity set is a BLER and the given first-type measurement quantity is greater than the first threshold; the given first-type measurement quantity is worse than the first threshold.

In one embodiment, the first behavior comprises determining whether the PHY of the first node transmits the first-type information to the higher layer of the first node according to whether the first condition is satisfied.

In one embodiment, the first behavior comprises: if the first condition is satisfied, the PHY of the first node transmits the first-type information to the higher layer of the first node.

In one embodiment, the first behavior comprises: if the first condition is not satisfied, the PHY of the first node does not transmit the first-type information to the higher layer of the first node.

In one embodiment, the meaning of the phrase of stopping a first behavior includes: regardless of whether the first condition is satisfied, the first node stops the first behavior.

In one embodiment, the meaning of the phrase of stopping a first behavior includes: regardless of whether the first condition is satisfied, the PHY of the first node does not transmit the first-type information to the higher layer of the first node.

In one embodiment, the meaning of the phrase of stopping a first behavior includes: when the first condition is satisfied, the PHY of the first node does not transmit the first-type information to the higher layer of the first node.

In one embodiment, the first behavior comprises: the first counter is maintained according to whether the PHY of the first node transmits the first-type information to the higher layer of the first node.

Embodiment 8

Embodiment 8 illustrates a schematic diagram of a relation between a first condition set and a first behavior according to one embodiment of the present disclosure, as shown in FIG. 8. In embodiment 18, when and only when each condition in the first condition set is satisfied, and as a response to the behavior of receiving the first signaling, the first node stops the first behavior.

In one embodiment, the first condition set only comprises a condition.

In one embodiment, the first condition set comprises more than one condition.

In one embodiment, the first condition set comprises: a DCI format of the first signaling belongs to a first format set, and the first format set comprises at least one DCI format.

In one subembodiment of the above embodiment, the first format set comprises at least one of DCI format 1_1 or DCI format 1_2.

In one subembodiment of the above embodiment, the first format set consists of one or more of DCI format 1_1 or DCI format 1_2.

In one embodiment, the first condition set comprises: A Radio Network Temporary Identifier (RNTI) used to scramble a CRC of the first signaling belongs to a first ID set, and the first ID set comprises at least one RNTI.

In one subembodiment of the above embodiment, the first ID set comprises one or more of a Cell-RNTI (C-RNTI), an MCS-C-RNTI or a Configured Scheduling-RNTI (CS-RNTI).

In one subembodiment of the above embodiment, the first ID set consists of one or more of a C-RNTI, an MCS-C-RNTI or a CS-RNTI.

Embodiment 9

Embodiment 9 illustrates a schematic diagram of a first condition set according to one embodiment of the present disclosure, as shown in FIG. 9. In embodiment 9, the first condition set comprises: time-frequency resources occupied by the first signal belong to a first resource set.

In one embodiment, the first condition set only comprises: time-frequency resources occupied by the first signal belong to the first resource set.

In one embodiment, in addition to time-frequency resources occupied by the first signaling belonging to the first resource set, the first condition set also comprises at least one other condition.

In one embodiment, the first resource set comprises at least one COntrol REsource SET (CORESET).

In one embodiment, the first resource set comprises a plurality of CORESETs, and any two CORESETs in the first resource set correspond to a same first-type index; the first-type index is a non-negative integer.

In one embodiment, the first resource set comprises a plurality of CORESETs, and values of a third higher-layer parameter corresponding to any two CORESETs in the first resource set are the same.

In one embodiment, any CORESET in the first resource set is configured with a third higher-layer parameter equal to 0 or is not configured with a third higher-layer parameter; or, any CORESET in the first resource set is configured with a third higher-layer parameter equal to 1.

In one embodiment, the first resource set comprises at least one search space set.

In one embodiment, the first resource set comprises a plurality of search space sets, and any two search space sets in the first resource set correspond to a same second-type index; the second-type index is a non-negative integer.

In one embodiment, the first resource set comprises a plurality of search space sets, and a CORESET associated with any two search space sets in the first resource set correspond to a same first-type index; the first-type index is a non-negative integer.

In one embodiment, the first-type index is configured by a higher-layer parameter.

In one embodiment, the second-type index is configured by a higher-layer parameter.

In one embodiment, the first resource set comprises a plurality of search space sets, and values of third higher-layer parameters corresponding to CORESETs associated with any two search space sets in the first resource set are the same.

In one embodiment, a CORESET associated with any search space set in the first resource set is configured with a third higher-layer parameter equal to 0 or is not configured with a third higher-layer parameter; or, a CORESET associated with any search space set in the first resource set is configured with a third higher-layer parameter equal to 1.

In one embodiment, the first resource set comprises more than one PDCCH candidate.

In one embodiment, the first reference signal set is used to determine the first resource set.

In one embodiment, the first reference signal set is used to determine a value of the first-type index corresponding to each CORESET in the first resource set.

In one embodiment, the first reference signal set is used to determine a value of the second-type index corresponding to each search space set in the first resource set.

In one embodiment, the first reference signal set is used to determine a value of a third higher-layer parameter corresponding to each CORESET in the first resource set.

In one embodiment, the first reference signal set corresponds to a first higher-layer parameter, and a value of the first higher-layer parameter is used to determine the first resource set.

In one subembodiment of the above embodiment, the first reference signal set is configured with the first higher-layer parameter.

In one subembodiment of the above embodiment, each reference signal in the first reference signal set is configured with the first higher-layer parameter.

In one subembodiment of the above embodiment, the first higher-layer parameter is configured by an RRC signaling In one subembodiment of the above embodiment, a corresponding relation between the first reference signal set and the first higher-layer parameter is configured by an RRC signaling In one subembodiment of the above embodiment, the first higher-layer parameter is a non-negative integer.

In one subembodiment of the above embodiment, if a value of the first higher-layer parameter is equal to a first parameter value, each CORESET in the first resource set is configured with a third higher-layer parameter equal to 0 or is not configured with a third higher-layer parameter; if a value of the first higher-layer parameter is equal to a second parameter value, each CORESET in the first resource set is configured with a third higher-layer parameter equal to 1.

In one subembodiment of the above embodiment, if a value of the first higher-layer parameter is equal to a first parameter value, a CORESET associated with each search space set in the first resource set is configured with a third higher-layer parameter equal to 0 or is not configured with a third higher-layer parameter; and if a value of the first higher-layer parameter is equal to a second parameter value, a CORESET associated with each search space set in the first resource set is configured with a third higher-layer parameter equal to 1.

In one subembodiment of the above embodiment, the first parameter value and the second parameter value are respectively non-negative integers.

In one subembodiment of the above embodiment, the first parameter value is not equal to the first parameter value.

In one embodiment, the first reference signal set is used to determine the first radio resource pool.

In one embodiment, the first higher-layer parameter is used to determine the first radio resource pool.

In one embodiment, the first radio resource pool is configured with a second higher-layer parameter by an RRC signaling, and the second higher-layer parameter corresponds to the first higher-layer parameter.

In one subembodiment of the above embodiment, a corresponding relation between the second higher-layer parameter and the first higher-layer parameter is configured by an RRC signaling.

In one subembodiment of the above embodiment, the second higher-layer parameter is equal to the first higher-layer parameter.

In one subembodiment of the above embodiment, the second higher-layer parameter is used to determine a spatial relation of signals transmitted in the first radio resource pool.

In one subembodiment of the above embodiment, the second higher-layer parameter is a non-negative integer.

In one embodiment, the third higher-layer parameter is a higher-parameter coresetPoolIndex.

In one embodiment, a name of the third higher-layer parameter comprises "coresetPool".

In one embodiment, a name of the third higher-layer parameter comprises "coreset" and "Pool".

Embodiment 10

Embodiment 10 illustrates a schematic diagram of a first condition set according to one embodiment of the present disclosure, as shown in FIG. 10. In embodiment 10, the first reference signal set corresponds to a first higher-layer parameter; the first condition set comprises: a value of the first higher-layer parameter is equal to a target parameter value.

In one embodiment, the first condition set only comprises that a value of the first higher-layer parameter is equal to the target parameter value.

In one embodiment, in addition to a value of the first higher-layer parameter being equal to the target parameter value, the first condition set also comprises at least one other condition.

In one embodiment, the first reference signal set is configured with the first higher-layer parameter.

In one embodiment, a corresponding relation between the first reference signal set and the first higher-layer parameter is configured by an RRC signaling.

In one embodiment, the first higher-layer parameter is a non-negative integer.

In one embodiment, the first signaling is used to determine the target parameter value.

In one embodiment, the first signaling sequentially indicates two transmission states, the first transmission state is one of the two transmission states, and a position of the first transmission state in the two transmission states is used to determine the target parameter value.

In one subembodiment of the above embodiment, if the first transmission state is a first transmission state of the two transmission states, the target parameter value is equal to a first parameter value; if the first transmission state is a second transmission state of the two transmission states, the target parameter value is equal to a second parameter value.

In one subembodiment of the above embodiment, the two transmission states are respectively two TCI states.

In one subembodiment of the above embodiment, the two transmission states are respectively two QCL relations.

In one subembodiment of the above embodiment, the two transmission states are respectively two QCL information.

In one subembodiment of the above embodiment, the two transmission states are respectively two spatial relations.

In one subembodiment of the above embodiment, the first signaling comprises two fields, the two fields respectively indicate the two transmission states, and the two fields occurs successively in the first signaling; a first field in the two fields indicates the first transmission state; if the first field is a first one of the two fields, the target parameter value is equal to a first parameter value; and if the first field is a second one of the two fields, the target parameter value is equal to a second parameter value.

In one embodiment, time-frequency resources occupied by the first signaling are used to determine the target parameter value.

In one embodiment, a CORESET to which the first signaling belongs is used to determine the target parameter value.

In one embodiment, if a CORESET to which the first signaling belongs is configured with a third higher-layer parameter equal to 0 or is not configured with a third higher-layer parameter, the target parameter value is equal to a first parameter value; and if a CORESET to which the first signaling belongs is configured with a third higher-layer parameter equal to 1, the target parameter value is equal to a second parameter value.

In one embodiment, the first node is configured with a first resource set and a second resource set; the first transmission state is applicable to only the first resource set in the first resource set and the second resource set, and the first resource set is used to determine the target parameter value.

In one subembodiment of the above embodiment, the first resource set and the second resource set respectively comprise at least one CORESET.

In one subembodiment of the above embodiment, the first resource set and the second resource set respectively comprise at least one search space set.

In one subembodiment of the above embodiment, the first resource set and the second resource set belong to a same carrier.

In one subembodiment of the above embodiment, the first resource set and the second resource set belong to a same BWP.

In one subembodiment of the above embodiment, the first resource set and the second resource set belong to a same serving cell.

In one subembodiment of the above embodiment, any CORESET in a given resource set is configured with a third higher-layer parameter equal to 1; or, any CORESET in a given resource set is configured with a third higher-layer parameter equal to 0 or is not configured with a third higher-layer parameter; the given resource set is any resource set in the first resource set or the second resource set.

In one subembodiment of the above embodiment, the first transmission state is only used in the first resource set and the second resource set as a TCI state of a PDCCH transmitted in the first resource set.

In one embodiment, the first parameter value and the second parameter value are respectively non-negative integers.

In one embodiment, the first parameter value is not equal to the second parameter value.

In one embodiment, the third higher-layer parameter is a higher-parameter coresetPoolIndex.

In one embodiment, a name of the third higher-layer parameter comprises "coresetPool".

In one embodiment, a name of the third higher-layer parameter comprises "coreset" and "Pool".

Embodiment 11

Embodiment 11 illustrates a schematic diagram of a first condition set according to one embodiment of the present disclosure, as shown in FIG. 11. In embodiment 11, the first condition set comprises: the first reference signal and a second reference signal are QCL, the second reference signal belongs to a second reference signal set, and a second-type measurement corresponding to the second reference signal is greater than or equal to a second threshold.

In one embodiment, the first condition set only comprises that the first reference signal and the second reference signal are QCL.

In one embodiment, in addition to that the first reference signal and the second reference signal are QCL, the first condition set also comprises at least one other condition.

In one embodiment, the first condition set comprises: the first reference signal and the second reference signal are QCL corresponding to QCL-TypeD.

In one embodiment, the second reference signal set only comprises the second reference signal.

In one embodiment, the second reference signal set also comprises at least one reference signal in addition to the second reference signal.

In one embodiment, the second reference signal set comprises a CSI-RS.

In one embodiment, the second reference signal set comprises an SSB.

In one embodiment, any reference signal in the second reference signal set is a CSI-RS or an SSB.

In one embodiment, an index of any reference signal in the second reference signal set comprises one of an SSB-Index or an NZP-CSI-RS-ResourceId.

In one embodiment, all reference signals in the second reference signal set belong to a same BWP.

In one embodiment, all reference signals in the second reference signal set belong to a same serving cell.

In one embodiment, there exist two reference signals in the second reference signal set belonging to different BWPs.

In one embodiment, there exist two reference signals in the second reference signal set belonging to different serving cells.

In one embodiment, a third information block indicates the second reference signal set, and the third information block is carried by an RRC signaling.

In one subembodiment of the above embodiment, the third information block comprises all or partial information in a candidateBeamRSList field in a BeamFailureRecoveryConfig IE.

In one subembodiment of the above embodiment, the third information block indicates an index of each reference signal in the second reference signal set.

In one subembodiment of the above embodiment, the third information block indicates a BWP ID corresponding to each reference signal in the second reference signal set.

In one subembodiment of the above embodiment, the third information block indicates a cell ID associated with each reference signal in the second reference signal set.

In one embodiment, a measurement performed on each reference signal in the second reference signal set is used to determine a second-type measurement quantity.

In one embodiment, for any given reference signal in the second reference signal group set, a measurement performed on the given reference signal in a second time interval is used to determine a second-type measurement quantity corresponding to the given reference signal.

In one embodiment, for any given reference signal in the second reference signal set, the first node calculates a second-type measurement quantity corresponding to the given reference signal only according to a measurement for the given reference signal within a second time interval.

In one embodiment, the second time interval is a consecutive duration.

In one embodiment, a length of the second time interval is equal to $T_{Evaluate\_CBD\_SSB}$ ms or $T_{Evaluate\_CBD\_CSI-RS}$ ms.

In one embodiment, definitions of $T_{Evaluate\_CBD\_SSB}$ or $T_{Evaluate\_CBD\_CSI-RS}$ can be found in 3GPP TS38.133.

In one embodiment, the second-type measurement quantity is an RSRP.

In one embodiment, the second-type measurement quantity is an L1-RSRP.

In one embodiment, the second-type measurement quantity is an SINR.

In one embodiment, the second-type measurement quantity is an L1-SINR.

In one embodiment, the second-type measurement quantity is a BLER.

In one embodiment, if a second-type measurement quantity is one of an RSRP, an L1-RSRP, an SINR or an L1-SINR and the second-type measurement quantity is greater than the second threshold, the second-type measurement quantity is greater than the second threshold.

In one embodiment, if a second-type measurement quantity is a BLER and the second-type measurement quantity is less than the second threshold, the second-type measurement quantity is greater than the second threshold.

In one embodiment, a given reference signal is a reference signal in the second reference signal set.

In one subembodiment of the above embodiment, a second-type measurement quantity corresponding to the given reference signal is equal to one of an RSRP, an L1-RSRP, an SINR or an L1-SINR of the given reference signal.

In one subembodiment of the above embodiment, a second-type measurement quantity corresponding to the given reference signal is equal to L1-RSRP after received power of the given reference signal is scaled according to a value indicated by a higher-layer parameter powerControlOffsetSS.

In one subembodiment of the above embodiment, a second-type measurement quantity corresponding to the given reference signal is obtained by table looking-up an RSRP, an L1-RSRP, an SINR or an L1-SINR of the given reference signal.

In one subembodiment of the above embodiment, the given reference signal is any reference signal in the second reference signal set.

In one embodiment, the second threshold is a real number.

In one embodiment, the second threshold is a non-negative real number.

In one embodiment, the second threshold is a non-negative real number not greater than 1.

In one embodiment, the second threshold is equal to $Q_{in\_LR}$.

In one embodiment, the definition of $Q_{in\_LR}$ can be found in 3GPP TS38.133.

In one embodiment, the second threshold is configured by a higher-layer parameter rsrp-ThresholdSSB.

In one embodiment, the second reference signal group comprises S2 reference signals, S2 being a positive integer greater than 1; the S2 reference signals respectively correspond to the S2 thresholds, and the second threshold is a threshold corresponding to the second reference signal among the S2 thresholds; there exist two unequal thresholds in the S2 thresholds.

In one embodiment, the second-type measurement quantity corresponding to any reference signal different from the second reference signal in the second reference signal set is worse than a second-type measurement quantity corresponding to the second reference signal.

In one embodiment, there exists a second-type measurement quantity corresponding to a reference signal different from the second reference signal in the second reference signal set greater than or equal to a second-type measurement quantity corresponding to the second reference signal.

In one embodiment, only a second-type measurement quantity corresponding to the second reference signal in the second reference signal set is greater than or equal to the second threshold.

In one embodiment, there exist second-type measurement quantities corresponding to S3 reference signals in the second reference signal set greater than or equal to the second threshold, S3 being a positive integer greater than 1; the first condition set comprises: the first reference signal and one of the S3 reference signals are QCL.

In one subembodiment of the above embodiment, the second reference signal is one of the S3 reference signals.

Embodiment 12

Embodiment 12 illustrates a schematic diagram of a first condition set according to one embodiment of the present disclosure, as shown in FIG. 12. In embodiment 12, the first condition set comprises: the first reference signal and any reference signal in the first reference signal set are not QCL.

In one embodiment, the first condition set only comprises that the first reference signal and any reference signal in the first reference signal set are not QCL.

In one embodiment, in addition to that the first reference signal and any reference signal in the first reference signal set are not QCL, the first condition set also comprises at least one other condition.

In one embodiment, the first condition set comprises: the first reference signal and any reference signal in the first reference signal set are not QCL corresponding to QCL-TypeD.

In one embodiment, the first reference signal set is used to determine a first SSB set, and the first SSB set comprises at least one SSB; a number of reference signals comprised in the first reference signal set is equal to a number of SSBs comprised in the first SSB set, and all reference signals in the first reference signal set respectively correspond to all SSBs in the first SSB set; any reference signal in the first reference signal set is a corresponding SSB or is QCL with a corresponding SSB; a first SSB is an SSB, and the first reference signal is the first SSB or the first reference signal and the first SSB are QCL; the first condition set comprises: an SSB index of the first SSB is different from an SSB-Index of any SSB in the first SSB set.

In one subembodiment of the above embodiment, any reference signal in the first reference signal set is a corresponding SSB or is QCL corresponding to QCL-TypeD with a corresponding SSB.

In one subembodiment of the above embodiment, the first reference signal is the first SSB or the first reference signal and the first SSB are QCL corresponding to QCL-TypeD.

In one embodiment, there exist two SSBs in the first SSB set corresponding to a same SSB-Index.

In one embodiment, there exist two SSBs in the first SSB set corresponding to different SSB-Indexes.

In one embodiment, any two SSBs in the first SSB set correspond to different SSB-Indexes.

Embodiment 13

Embodiment 13 illustrates a schematic diagram of a first condition set according to one embodiment of the present disclosure, as shown in FIG. 13. In embodiment 13, the first reference signal is associated with a first cell, and the first condition set comprises: the first cell is a serving cell of the first node.

In one embodiment, the first condition set only comprises that the first cell is a serving cell of the first node.

In one embodiment, in addition to that the first cell is a serving cell of the first node, the first condition set also comprises at least one other condition.

In one embodiment, the meaning of the phrase of the first reference signal being associated with the first cell includes: a PCI of the first cell is used to generate the first reference signal.

In one embodiment, the meaning of the phrase of the first reference signal being associated with the first cell includes: an SCellIndex or ServCellIndex of the first cell is used to generate the first reference signal.

In one embodiment, the meaning of the phrase of the first reference signal being associated with the first cell includes: the first reference signal and an SSB of the first cell are QCL.

In one embodiment, the meaning of the phrase of the first reference signal being associated with the first cell includes: the first reference signal is transmitted by the first cell.

In one embodiment, the meaning of the phrase of the first reference signal being associated with the first cell includes: radio resources occupied by the first reference signal are indicated by a configuration signaling, an RLC bearer that the configuration signaling goes through is configured by a CellGroupConfig IE, and a Special Cell (SpCell) configured by the CellGroupConfig IE comprises the first cell.

In one subembodiment of the above embodiment, the configuration signaling comprises an RRC signaling.

In one subembodiment of the above embodiment, the radio resources comprise time-frequency resources.

In one subembodiment of the above embodiment, the radio resources comprise an RS sequence.

In one subembodiment of the above embodiment, the radio resources comprise code-domain resources.

In one subembodiment of the above embodiment, the code-domain resources comprise one or more of a pseudo-random sequence, a low Peak-to-Average Power Ratio (PAPR) sequence, a cyclic shift, an Orthogonal Cover Code (OCC) or an orthogonal sequence.

In one embodiment, the first cell is identified by a first index.

In one subembodiment of the above embodiment, the first transmission state indicates the first index.

In one subembodiment of the above embodiment, the first transmission state indicates that the first index is an ID of a cell to which the first reference signal is associated.

In one subembodiment of the above embodiment, the first index is a SCellIndex corresponding to the first cell.

In one subembodiment of the above embodiment, the first index is a ServCellIndex corresponding to the first cell.

In one subembodiment of the above embodiment, the first index is a CellIdentity corresponding to the first cell.

In one subembodiment of the above embodiment, the first index is a PhysCellId corresponding to the first cell.

In one embodiment, the SCellIndex is a positive integer not greater than 31.

In one embodiment, the ServCellIndex is non-negative integer not greater than 31.

In one embodiment, the meaning of the phrase of the first cell being a serving cell of the first node includes: the first node executes SCell addition for the first cell.

In one embodiment, the meaning of the phrase of the first cell being a serving cell of the first node includes: a sCellToAddModList newly received by the first node comprises the first cell.

In one embodiment, the meaning of the phrase of the first cell being a serving cell of the first node includes: a sCellToAddModList or a sCellToAddModListSCG newly received by the first node comprises the first cell.

In one embodiment, the meaning of the phrase of the first cell being a serving cell of the first node includes: the first node is allocated a SCellIndex for the first cell.

In one embodiment, the meaning of the phrase of the first cell being a serving cell of the first node includes: the first node is allocated a ServCellIndex for the first cell.

In one embodiment, the meaning of the phrase of the first cell being a serving cell of the first node includes: an RRC connection is established between the first node and the first cell.

In one embodiment, the meaning of the phrase of the first cell being a serving cell of the first node includes: a C-RNTI of the first node is allocated by the first cell.

In one embodiment, the first cell is a Primary Cell (PCell) of the first node.

In one embodiment, the first cell belongs to a Master Cell Group (MCG) of the first node.

In one embodiment, the first cell belongs to a Secondary Cell Group (SCG) of the first node.

In one embodiment, the second node is a maintenance base station of the first cell.

In one embodiment, the second node is not a maintenance base station of the first cell.

Embodiment 14

Embodiment 14 illustrates a schematic diagram of a relation between a second information block and a first behavior according to one embodiment of the present disclosure, as shown in FIG. 14. In embodiment 14, the second information block is used for updating the first reference signal set; as a response to the behavior of receiving the second information block, the first node recovers the first behavior.

In one embodiment, the meaning of the phrase of the second information block being used to update the first reference signal set includes: the second information block is used to reconfigure the first reference signal set.

In one embodiment, the second information block is carried by a higher-layer signaling In one embodiment, the second information block is carried by an RRC signaling.

In one embodiment, the second information block is carried by a MAC CE signaling.

In one embodiment, the second information block comprises information in all or partial fields in an IE.

In one embodiment, the second information block comprises information in all or partial fields in a first IE.

In one subembodiment of the above embodiment, a name of the first IE comprises "BeamFailureRecovery".

In one subembodiment of the above embodiment, the second information comprises information in a second field in the first IE, and a name of the second field comprises "candidateBeamRS".

In one embodiment, the second information block is carried by a candidateBeamRSList field in a BeamFailureRecovery IE, a candidateBeamRSListExt field in a BeamFailureRecovery IE or a andidateBeamRSSCellList field in a BeamFailureRecoverySCellConfig IE.

In one embodiment, the second information block is a first one of information blocks used to update the first reference signal set received by the first node after the first signaling.

In one embodiment, the meaning of the phrase of recovering the first behavior includes: recovering a measurement performed on the first reference signal set.

In one embodiment, the meaning of the phrase of recovering the first behavior includes: recovering maintaining the first counter.

In one embodiment, the meaning of the phrase of recovering the first behavior includes: recovering determining whether a value of the first counter is increased by 1 or remains unchanged according to whether a beam failure instance indication from the physical layer is received.

In one embodiment, the meaning of the phrase of recovering the first behavior includes: if a beam failure instance indication from the physical layer is received, a value of the first counter is increased by 1; otherwise a value of the first counter remains unchanged.

In one embodiment, the meaning of the phrase of recovering the first behavior includes: recovering transmitting the third signal.

In one embodiment, the meaning of the phrase of recovering the first behavior includes: recovering determining whether the third signal is transmitted according to whether a value of the first counter is greater than or equal to the first counter threshold.

In one embodiment, the meaning of the phrase of recovering the first behavior includes: if a value of the first counter is greater than or equal to the first counter threshold, the third signal is transmitted.

In one embodiment, the meaning of the phrase of recovering the first behavior includes: recovering determining whether the physical layer of the first node transmits the first-type information to the higher layer of the first node according to a measurement performed on the first reference signal set.

In one embodiment, the meaning of the phrase of recovering the first behavior includes: recovering determining whether the physical layer of the first node transmits the first-type information to the higher layer of the first node according to whether the first condition is satisfied.

In one embodiment, the meaning of the phrase of recovering the first behavior includes: if the first condition is satisfied, the physical layer of the first node transmits the first-type information to the higher layer of the first node.

In one embodiment, as a response to the behavior of receiving the second information block, the first node recovers the first behavior after a second time, and time-domain resources occupied by the second information block are used to determine the second time.

In one embodiment, as a response to the behavior of receiving the second information block, the first node starts recovering the first behavior from a second time, time-domain resources occupied by a fourth signal are used to determine the second time, and the fourth signal is used to indicate that the second information block is correctly received.

In one embodiment, a time interval between the second time and a third reference time is a fourth interval; the third reference time is earlier than the second time, and time-domain resources occupied by the second information block are used to determine the third reference time.

In one embodiment, a time interval between the second time and a third reference time is a fourth interval; the third reference time is earlier than the second time, and time-domain resources occupied by the fourth signal are used to determine the third reference time.

In one embodiment, the third reference time is a start or end time of time-domain resources occupied by the second information block.

In one embodiment, the third reference time is a start or end time of a time unit occupied by the second information block.

In one embodiment, the third reference time is a start or end time of time-domain resources occupied by the fourth signal.

In one embodiment, the third reference time is a start or end time of a time unit occupied by the fourth signal.

In one embodiment, the fourth interval is measured by slot.

In one embodiment, the fourth interval is measured by sub-slot.

In one embodiment, the fourth interval is measured by multicarrier symbol.

In one embodiment, the fourth interval is a non-negative integer.

In one embodiment, the fourth interval is fixed.

In one embodiment, the fourth interval is configured by a higher-layer parameter.

In one embodiment, as a response to the behavior of transmitting the second information block, the second node recovers monitoring the third signal in the first radio resource pool after the second time.

Embodiment 15

Figure 15:
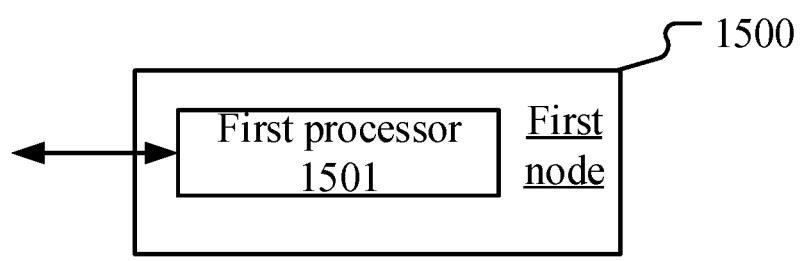
FIG. 15 illustrates a structure block diagram of a processing device in a first node according to one embodiment of the present disclosure.

Embodiment 15 illustrates a structure block diagram of a processing device in a first node according to one embodiment of the present disclosure, as shown in FIG. 15. In FIG. 15, the processing device 1500 in the first node comprises a first processor 1501.

in Embodiment 15, the first processor 1501 receives a first information block and a first signaling; as a response to the behavior of receiving the first signaling, the first processor 1500 stops a first behavior.

In embodiment 15, the first information block indicates a first reference signal set, and the first reference signal set comprises at least one reference signal; the first signaling comprises DCI, the first signaling is used to determine a first transmission state, and the first transmission state indicates a first reference signal; the first transmission state is applied to a first channel and a second channel; the first behavior is related to a measurement performed on the first reference signal set.

In one embodiment, the first behavior comprises that a physical layer of the first node transmits first-type information to a higher layer of the first node.

In one embodiment, the first processor 1501 receives a first signal in the first channel; herein, the first signaling comprises scheduling information of the first signal.

In one embodiment, the first processor 1501 transmits a first signal in the first channel; herein, the first signaling comprises scheduling information of the first signal.

In one embodiment, when and only when each condition in a first condition set is satisfied, as a response to the behavior of receiving the first signaling, the first processor 1501 stops the first behavior; and the first condition set comprises at least one condition.

In one embodiment, the first condition set comprises: the first reference signal and any reference signal in the first reference signal set are not QCL.

In one embodiment, the first reference signal is associated with a first cell, and the first condition set comprises: the first cell is a serving cell of the first node.

In one embodiment, the first processor 1501 receives a second information block, as a response to the behavior of receiving the second information block, the first processor 1501 recovers the first behavior; herein, the second information block is used for updating the first reference signal set; and the second information block is later than the first signaling in time domain.

In one embodiment, the first node is a UE.

In one embodiment, the first node is a relay node.

In one embodiment, the first processor 1501 comprises at least one of the antenna 452, the transmitter/receiver 454, the transmitting processor 468, the receiving processor 456, the multi-antenna transmitting processor 457, the multi-antenna receiving processor 458, the controller/processor 459, the memory 460 or the data source 467 in Embodiment 4.

Embodiment 16

Figure 16:
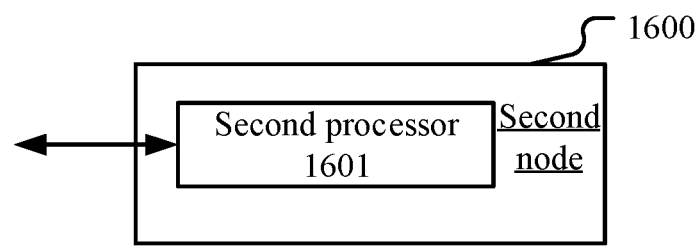
FIG. 16 illustrates a structure block diagram of a processing device in a second node according to one embodiment of the present disclosure.

Embodiment 16 illustrates a structure block diagram of a processing device in a second node according to one embodiment of the present disclosure, as shown in FIG. 16. In FIG. 16, a processing device 1600 of a second node comprises a second processor 1601.

In Embodiment 16, the second processor 1601 transmits a first information block and a first signaling.

In embodiment 16, the first information block indicates a first reference signal set, and the first reference signal set comprises at least one reference signal; the first signaling comprises DCI, the first signaling is used to determine a first transmission state, and the first transmission state indicates a first reference signal; the first transmission state is applied to a first channel and a second channel; as a response to the behavior of receiving the first signaling, a target receiver of the first signaling stops a first behavior; the first behavior is related to a measurement performed on the first reference signal set.

In one embodiment, the first behavior comprises that a physical layer of the target receiver of the first signaling transmits first-type information to a higher layer of the target receiver of the first signaling.

In one embodiment, the second processor 1601 transmits a first signal in the first channel, herein, the first signaling comprises scheduling information of the first signal.

In one embodiment, the second processor 1601 receives a first signal in the first channel; herein, the first signaling comprises scheduling information of the first signal.

In one embodiment, when and only when each condition in a first condition set is satisfied, as a response to the behavior of receiving the first signaling, the target receiver of the first signaling stops the first behavior; the first condition set comprises at least one condition.

In one embodiment, the first condition set comprises: the first reference signal and any reference signal in the first reference signal set are not QCL.

In one embodiment, the first reference signal is associated with a first cell, the first condition set comprises: the first cell is a serving cell of the target receiver of the first signaling.

In one embodiment, the second processor 1601 transmits second information; herein, the second information block is used for updating the first reference signal set; and the second information block is later than the first signaling in time domain; as a response to the behavior of receiving the second information block, a target receiver of the second information block recovers the first behavior.

In one embodiment, the second node is a base station.

In one embodiment, the second node is a UE.

In one embodiment, the second node is a relay node.

In one embodiment, the second processor 1601 comprises at least one of the antenna 420, the transmitter/receiver 418, the transmitting processor 416, the receiving processor 470, the multi-antenna transmitting processor 471, the multi-antenna receiving processor 472, the controller/processor 475 or memory 476 in Embodiment 4.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The user equipment, terminal and UE include but are not limited to Unmanned Aerial Vehicles (UAVs), communication modules on UAVs, telecontrolled aircrafts, aircrafts, diminutive airplanes, mobile phones, tablet computers, notebooks, vehicle-mounted communication equipment, vehicles, cars, RSUs, wireless sensors, network cards, Internet of Things (IoT) terminals, RFID terminals, NB-IOT terminals, Machine Type Communication (MTC) terminals, enhanced MTC (eMTC) terminals, data card, network cards, vehicle-mounted communication equipment, low-cost mobile phones, low-cost tablets and other wireless communication devices. The base station or system equipment in the present disclosure includes but is not limited to macro-cellular base stations, micro-cellular base stations, Pico base stations, home base stations, relay base stations, eNB, gNB, Transmitter Receiver Points (TRPs), GNSS, relay satellites, satellite base stations, space base stations, RSUs, UAVs, test devices, such as a transceiver or a signaling tester that simulates some functions of a base station, and other wireless communication devices.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
a first processor, receiving a first information block and a first signaling, as a response to a behavior of receiving the first signaling, stopping a first behavior;
wherein the first information block indicates a first reference signal set, and the first reference signal set comprises at least one reference signal; the first signaling comprises DCI, the first signaling indicates a first transmission state, the first transmission state is a TCI state and comprises QCL information, and the first transmission state indicates a first reference signal; the first transmission state is applied to a first channel and a second channel; the first channel comprises a PDSCH and the second channel comprises a PUSCH, or, the first channel comprises a PDSCH and the second channel comprises a PDCCH; the first behavior comprises beam failure detection or beam failure recovery request, and the first behavior is related to a measurement performed on the first reference signal set.

2. The first node according to claim 1, wherein the first behavior comprises that a physical layer of the first node transmits first-type information to a higher layer of the first node.

3. The first node according to claim 1, wherein the first processor receives a first signal in the first channel, or, the first processor transmits a first signal in the first channel; wherein the first signaling comprises scheduling information of the first signal.

4. The first node according to claim 1, wherein when and only when each condition in a first condition set is satisfied, as a response to the behavior of receiving the first signaling, the first behavior is stopped; the first condition set comprises at least one condition.

5. The first node according to claim 4, wherein the first condition set comprises: the first reference signal and any reference signal in the first reference signal set are not quasi co-located.

6. The first node according to claim 4, wherein the first reference signal is associated with a first cell, and the first condition set comprises: the first cell is a serving cell of the first node.

7. The first node according to claim 1, wherein the first processor receives a second information block, as a response to the behavior of receiving the second information block, recovers the first behavior; wherein the second information block is used for updating the first reference signal set; and the second information block is later than the first signaling in time domain.

8. A second node for wireless communications, comprising:
a second processor, transmitting a first information block and a first signaling;
wherein the first information block indicates a first reference signal set, and the first reference signal set comprises at least one reference signal; the first signaling comprises DCI, the first signaling indicates a first transmission state, the first transmission state is a TCI state and comprises QCL information and the first transmission state indicates a first reference signal; the first transmission state is applied to a first channel and a second channel; as a response to thea behavior of receiving the first signaling, a target receiver of the first signaling stops a first behavior; the first channel comprises a PDSCH and the second channel comprises a PUSCH, or, the first channel comprises a PDSCH and the second channel comprises a PDCCH; the first behavior comprises beam failure detection or beam failure recovery request, and the first behavior is related to a measurement performed on the first reference signal set.

9. The second node according to claim 8, wherein the first behavior comprises that a physical layer of the target receiver of the first signaling transmits first-type information to a higher layer of the target receiver of the first signaling.

10. The second node according to claim 8, wherein the second processor transmits a first signal in the first channel, or, the second processor receives a first signal in the first channel;
wherein the first signaling comprises scheduling information of the first signal.

11. The second node according to claim 8, wherein when and only when each condition in a first condition set is satisfied, as a response to the behavior of receiving the first signaling, the target receiver of the first signaling stops the first behavior; the first condition set comprises at least one condition.

12. The second node according to claim 11, wherein the first condition set comprises: the first reference signal and any reference signal in the first reference signal set are not quasi co-located.

13. The second node according to claim 11, wherein the first reference signal is associated with a first cell, the first condition set comprises: the first cell is a serving cell of the target receiver of the first signaling.

14. The second node according to claim 8, wherein the second processor transmits a second information block; wherein the second information block is used for updating the first reference signal set; and the second information block is later than the first signaling in time domain; as a response to the behavior of receiving the second information block, a target receiver of the second information block recovers the first behavior.

15. A method in a first node for wireless communications, comprising:
receiving a first information block;
receiving a first signaling; and
as a response to a behavior of receiving the first signaling, stopping a first behavior;
wherein the first information block indicates a first reference signal set, and the first reference signal set comprises at least one reference signal; the first signaling comprises DCI, the first signaling indicates a first transmission state, the first transmission state is a TCI state and comprises QCL information and the first transmission state indicates a first reference signal; the first transmission state is applied to a first channel and a second channel; the first channel comprises a PDSCH and the second channel comprises a PUSCH, or, the first channel comprises a PDSCH and the second channel comprises a PDCCH; the first behavior comprises beam failure detection or beam failure recovery request, and the first behavior is related to a measurement performed on the first reference signal set.

16. The method according to claim 15, wherein the first behavior comprises that a physical layer of the first node transmits first-type information to a higher layer of the first node.

17. The method according to claim 15, comprising:
receiving a first signal in the first channel, or, transmitting a first signal in the first channel;
wherein the first signaling comprises scheduling information of the first signal.

18. The method according to claim 15, wherein when and only when each condition in a first condition set is satisfied, as a response to the behavior of receiving the first signaling, the first behavior is stopped; the first condition set comprises at least one condition.

19. The method according to claim 18, wherein the first condition set comprises: the first reference signal and any reference signal in the first reference signal set are not quasi co-located; or, the first reference signal is associated with a first cell, and the first condition set comprises: the first cell is a serving cell of the first node.

20. The method according to claim 15, comprising:
receiving a second information block; and
as a response of the behavior of receiving the second information block, recovering the first behavior;
wherein the second information block is used for updating the first reference signal set; and the second information block is later than the first signaling in time domain.

* * * * *